(12) United States Patent
Seo et al.

(10) Patent No.: US 12,255,873 B2
(45) Date of Patent: Mar. 18, 2025

(54) METHOD AND DEVICE FOR SPLIT TUNNELING

(71) Applicant: SAMSUNG ELECTRONICS CO., LTD., Suwon-si (KR)

(72) Inventors: Dongwon Seo, Suwon-si (KR); Taejune Kim, Suwon-si (KR); Kwangyong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 18/104,940

(22) Filed: Feb. 2, 2023

(65) Prior Publication Data

US 2023/0208812 A1 Jun. 29, 2023

Related U.S. Application Data

(63) Continuation of application No. PCT/KR2022/015998, filed on Oct. 20, 2022.

(30) Foreign Application Priority Data

Dec. 27, 2021 (KR) .................. 10-2021-0188897
Feb. 24, 2022 (KR) .................. 10-2022-0024029

(51) Int. Cl.
*H04L 9/40* (2022.01)
(52) U.S. Cl.
CPC ...... *H04L 63/0263* (2013.01); *H04L 63/0236* (2013.01); *H04L 63/0272* (2013.01)
(58) Field of Classification Search
CPC ............ H04L 63/0263; H04L 63/0236; H04L 63/0272
See application file for complete search history.

(56) References Cited

U.S. PATENT DOCUMENTS 7,801,030 B1 9/2010 Aggarwal et al.
8,990,884 B2 * 3/2015 Hoyos ................. G06F 21/604
726/28

(Continued)

FOREIGN PATENT DOCUMENTS

KR         10-1492442 B1    2/2015
KR    10-2015-0023620 A    3/2015

(Continued)

OTHER PUBLICATIONS

PCT International Search Report dated Jan. 20, 2023 for PCT/KR2022/015998.

(Continued)

*Primary Examiner* — Viral S Lakhia
(74) *Attorney, Agent, or Firm* — Nixon & Vanderhye P.C.

(57) ABSTRACT

An electronic device may obtain a security rule for supporting split tunneling, check a condition for executing a first operation related to bypassing the VPN tunnel by comparing a first value to information based on a first offset in a first element of the packet based on the security rule, check a condition for performing a second operation related to bypassing the VPN tunnel by comparing a second value to information based on a second offset in a second element of the packet when the condition for executing the first operation is satisfied and the first operation instructs that the second element of the packet be inspected, encapsulate the packet while not including the packet in the VPN tunnel and transmit the encapsulated packet to a packet forwarding server, and include the packet in the VPN tunnel and transmit the packet to the packet forwarding server.

29 Claims, 12 Drawing Sheets

(56) References Cited

U.S. PATENT DOCUMENTS

| | | | |
|---|---|---|---|
| 9,313,183 B2* | 4/2016 | May | H04L 63/029 |
| 10,250,624 B2* | 4/2019 | Mixer | H04L 63/0245 |
| 10,447,591 B2* | 10/2019 | Cohn | H04L 12/4633 |
| 10,637,890 B2* | 4/2020 | Chen | H04L 41/0895 |
| 10,904,217 B2* | 1/2021 | Sullenberger | H04L 9/0833 |
| 11,240,208 B2* | 2/2022 | Yin | H04L 63/0428 |
| 11,362,999 B2* | 6/2022 | Rudnik | H04L 63/0272 |
| 11,405,399 B2* | 8/2022 | Bhattacharya | G06F 21/606 |
| 11,425,098 B2* | 8/2022 | Bosch | H04L 63/08 |
| 11,531,749 B2* | 12/2022 | Figovsky | G06F 21/606 |
| 11,539,668 B2* | 12/2022 | Kondapavuluru | H04L 63/0428 |
| 2013/0318345 A1 | 11/2013 | Hengeveld | |
| 2019/0334864 A1 | 10/2019 | Yin et al. | |
| 2023/0139239 A1* | 5/2023 | Tachiwana | C03C 3/068 501/78 |

FOREIGN PATENT DOCUMENTS

| | | |
|---|---|---|
| KR | 10-1680955 B1 | 11/2016 |
| KR | 10-2021-0046615 A | 4/2021 |
| WO | WO 2021/170092 | 9/2021 |

OTHER PUBLICATIONS

Extended European Search Report dated Dec. 18, 2024 for EP Application No. 22916335.7.

* cited by examiner

| Record | Target 451 | Offset 452 | Value 453 | Comparison 454 | Operation 455 |
|---|---|---|---|---|---|
| 1 | First element 611 | 72 612 | 8 (TCP), 1 byte 613 | Equal 614 | Go to Record 2 615 |
| 2 | Second element 621 | 8 622 | 443 (TLS port), 2 bytes 623 | Equal 624 | Go to Record 3 625 |
| 3 | Third element 631 | 16 632 | 0x0303(TLS v1.2), 2 bytes 633 | Equal or Higher 634 | Bypass 635 |

610 → Record 1, 620 → Record 2, 630 → Record 3

FIG. 6A

| Record | Target | Offset | Value | Comparison | Operation |
|---|---|---|---|---|---|
| | 451 | 452 | 453 | 454 | 455 |
| 1 | First element 641 | 72 642 | 17 (UDP), 1 byte 643 | Equal 644 | Go to Record 2 645 |
| 2 | Second element 651 | 16 652 | 443 (TLS port), 2 bytes 653 | Equal 654 | Go to Record 3 655 |
| 3 | Third element 661 | 0 662 | 1(Long type Header), 1 bits 663 | Equal 664 | Go to Record 4 665 |
| 4 | Fourth element 671 | 72 672 | 0 (Version), 4 bytes 673 | Equal 674 | Bypass 675 |

| Record | Target | Offset | Value | Comparison | Operation |
|---|---|---|---|---|---|
| 1 | First element 681 | 72 682 | 8 (TCP), 1 byte 683 | Equal 684 | Go to Record 2 685 |
| 2 | Second element 687 | 16 688 | 69 (TFTP port), 2 bytes 689 | Equal 690 | Go to Record 3 691 |
| 3 | Third element 693 | 0 694 | 1-5 (Operation Code), 2bytes 695 | Between 1 to 5 696 | Use VPN tunnel 697 |

FIG. 6C

METHOD AND DEVICE FOR SPLIT TUNNELING

CROSS-REFERENCE TO RELATED APPLICATIONS

This application is a continuation application of International Application No. PCT/KR2022/015998 designating the United States, filed on Oct. 20, 2022, in the Korean Intellectual Property Receiving Office and claiming priority to Korean Patent Application No. 10-2021-0188897, filed on Dec. 27, 2021, and Korean Patent Application No. 10-2022-0024029, filed on Feb. 24, 2022, at the Korean Intellectual Property Office, the disclosures of which are all hereby incorporated herein by reference herein in their entireties.

BACKGROUND

1. Field

Certain example embodiments relate to a split tunneling method and/or device.

2. Description of Related Art

A virtual private network (hereinafter referred to as a VPN) may be used to enhance security while data is being transmitted between a terminal and a server or between a server and a server. The VPN may include a private communication network that a company or several groups use via a public network for communication without exposing internal information to the outside. The VPN may transmit data based on VPN tunneling. The VPN tunneling may be technology for protecting transmitted data and preventing or reducing the likelihood of an outsider from accessing a connection between an electronic device and a server. Unfortunately, including all transmitted data in the VPN tunnel may be inefficient. Therefore, a technique called split tunneling may be used. Split tunneling is a method of allowing only some traffic to go through the VPN tunnel and the remaining traffic being transmitted over the Internet.

SUMMARY

When an existing split tunneling technique is applied to packets destined for an unspecified destination, such a technique may have limitations. For example, when a user uses the Internet based on the existing split tunneling method, whether traffic shall be allowed or excluded may be determined based on IP, port, or domain name.

According to an example embodiment, when a packet bypasses a virtual private network (VPN) tunnel, the packet may be encapsulated and transmitted to a packet forwarding server.

According to an example embodiment, a packet included in the VPN tunnel and an encapsulated packet may be transmitted to the packet forwarding server and the packet included in the VPN tunnel may be transmitted to a target server via a VPN gateway. Also, the encapsulated packet may be decapsulated in the packet forwarding server and transmitted to the target server.

According to an example embodiment, a source address of all packets transmitted from the packet forwarding server may be changed to an address of the packet forwarding server.

According to an example embodiment, an electronic device may include at least one processor and a memory configured to store instructions executable by the at least one processor. The processor, for executing the instructions, may be configured to obtain a security rule for supporting split tunneling, wherein the security rule includes a plurality of rules for determining whether a packet bypasses a virtual private network (VPN) tunnel, check a condition for executing a first operation related to bypassing the VPN tunnel at least by comparing a first value to information based on a first offset in a first element of the packet, based on the security rule, check a condition for performing a second operation related to bypassing the VPN tunnel at least by comparing a second value to information based on a second offset in a second element of the packet when the condition for executing the first operation is satisfied and the first operation instructs that the second element of the packet be inspected, encapsulate the packet while not including the packet in the VPN tunnel and transmit the encapsulated packet to a packet forwarding server when the condition for executing the first operation and/or the condition for executing the second operation is satisfied, and the first operation and/or the second operation instructs that the packet bypass the VPN tunnel, and include the packet in the VPN tunnel and control to transmit the packet to the packet forwarding server when the condition for executing the first operation and/or the condition for executing the second operation is not satisfied.

According to an example embodiment, a split tunneling method may include obtaining a security rule for supporting split tunneling, wherein the security rule includes a plurality of rules for determining whether a packet bypasses a virtual private network (VPN) tunnel, checking a condition for executing a first operation related to bypassing the VPN tunnel by comparing a first value to information based on a first offset in a first element of the packet based on the security rule, checking a condition for performing a second operation related to bypassing the VPN tunnel by comparing a second value to information based on a second offset in a second element of the packet when the condition for executing the first operation is satisfied and the first operation instructs that the second element of the packet be inspected, encapsulating the packet while not including the packet in the VPN tunnel and transmitting the encapsulated packet to a packet forwarding server when the condition for executing the first operation or the condition for executing the second operation is satisfied and the first operation or the second operation instructs that the packet bypass the VPN tunnel, and including the packet in the VPN tunnel and transmitting the packet to the packet forwarding server when the condition for executing the first operation or the condition for executing the second operation is not satisfied.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 6A, 6B and 6C are diagrams illustrating various security rules according to an example embodiment(s);

DETAILED DESCRIPTION

Figure 1:
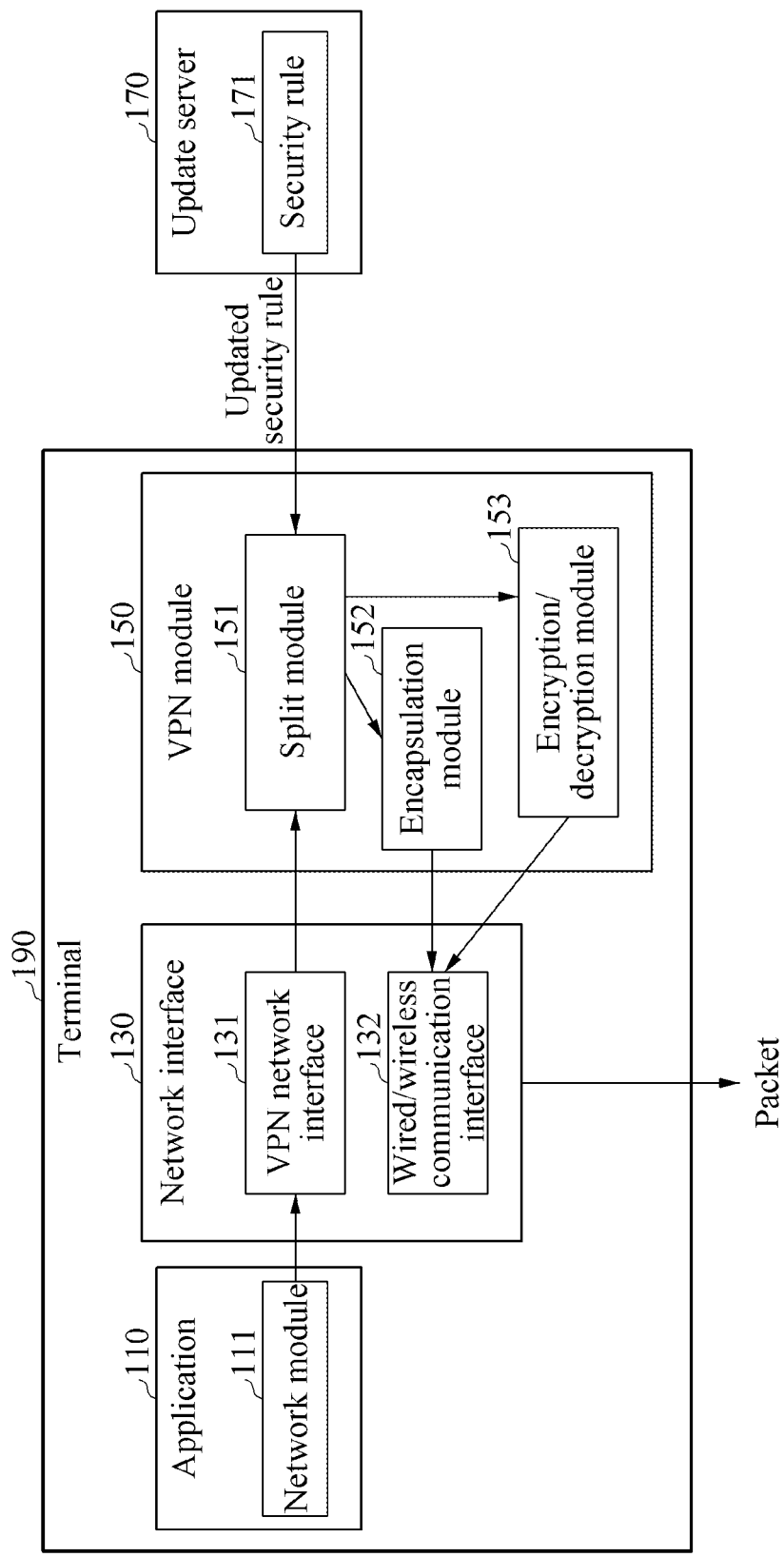
FIG. 1 is a block diagram illustrating a path through which a packet moves in a terminal according to an example embodiment.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, at least a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms used herein including technical or scientific terms have the same meaning as commonly understood by one of ordinary skill in the art to which examples belong. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. In the drawings, like reference numerals are used for like elements.

FIG. 1 is a block diagram illustrating a path through which a packet moves in a terminal according to an example embodiment.

FIG. 1 illustrates a terminal 190, an application 110, a network module 111, a network interface 130, a VPN network interface 131, a wired/wireless communication interface 132, a virtual private network (VPN) module 150, a split module 151, encapsulation module 152, encryption/decryption module 153, update server 170 and/or a security rule 171. The components shown in FIG. 1 are merely examples. Other components may be added and some of the components may be omitted. At least some of the modules shown in the drawings hereof may be configured as software modules. In this case, the software modules may be executed by a processor and an operation of each component may be interpreted as an operation of the processor. An inclusion relationship between modules (e.g., application and network modules) is merely an example and each module may exist individually.

Figure 10:
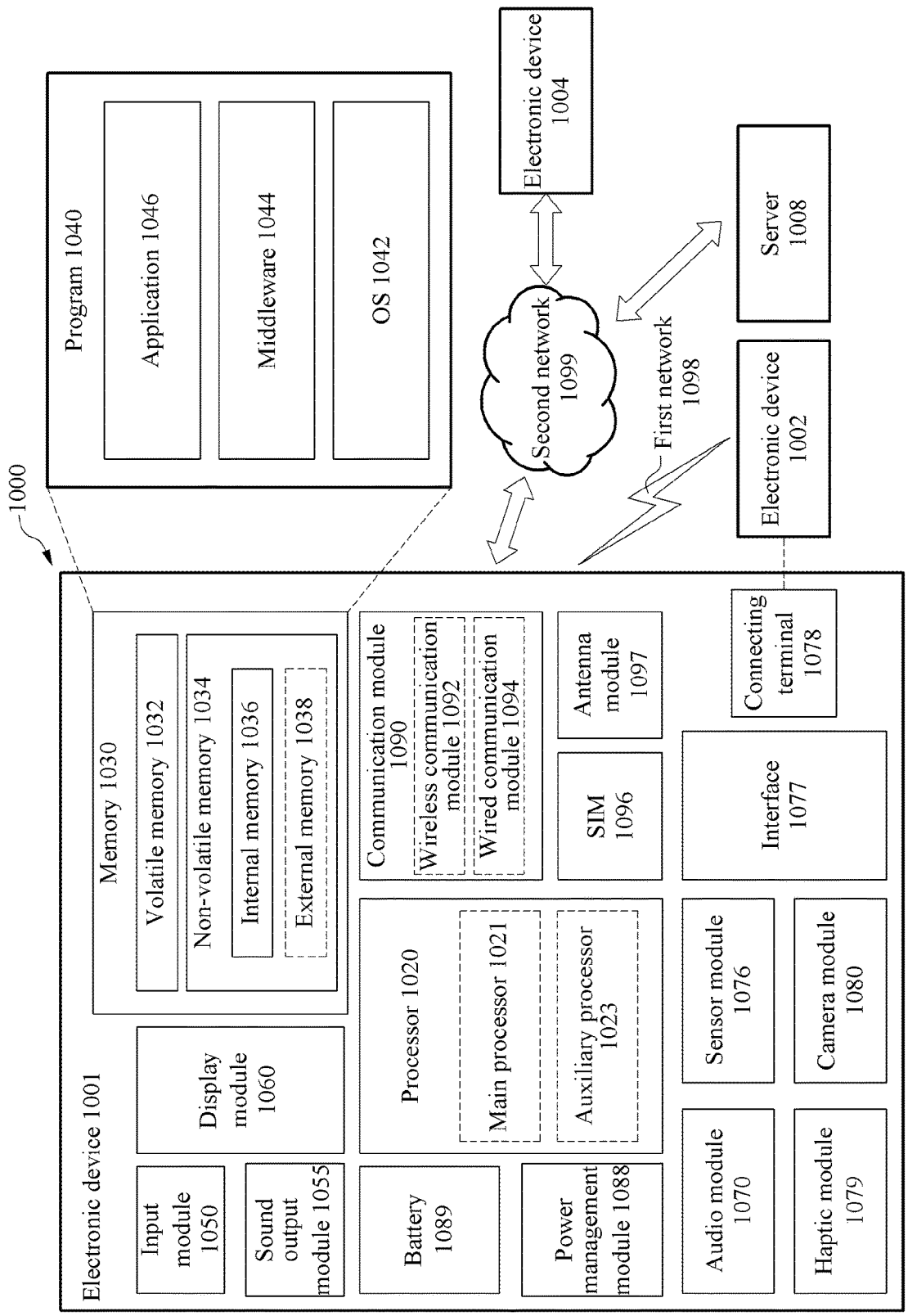
FIG. 10 is a block diagram illustrating an electronic device in a network environment according to an example embodiment.

The terminal 190 according to an example embodiment may include an electronic device 1001 (e.g., the electronic device 1001 in FIG. 10). The terminal 190 according to an example embodiment may include the application 110, the network interface 130, and/or the VPN module 150. The application 110 according to an example embodiment may be application software and include software executable in an operating system (e.g., the operating system 1042 in FIG. 10). The application according to an example embodiment may include the network module 111. The network module 111 according to an example embodiment may include a module for transmitting a packet from the application 110 to the network interface 130. The network interface 130 according to an example embodiment may include a module for connecting the electronic device 1001 (or the terminal 190) to a network for communications. The network interface 130 according to an example embodiment may include the VPN network interface 131 and/or the wired/wireless communication interface 132. The VPN network interface 131 according to an example embodiment may include a virtual kernel network interface for the VPN. For example, the VPN network interface 131 may include a TUN (TUNnel). The VPN network interface 131 according to an example embodiment may transmit a packet to the split module 151. The wired/wireless communication interface 132 according to an example embodiment may include a module for transmitting a packet received from the encapsulation module 152 or the encryption/decryption module 153 to a server or another electronic device online or offline. For example, the wired/wireless communication interface 132 may include an RMNET-type interface for a wired communication. For another example, the wired/wireless communication interface 132 may include a wireless local area network (WLAN)-type interface for wireless communication.

The VPN module 150 according to an example embodiment may include a received packet in the VPN tunnel or include a module for encapsulation. The VPN module 150 according to an example embodiment may include the split module 151, the encapsulation module 152, and/or the encryption/decryption module 153. The split module 151 according to an example embodiment may determine whether a packet received from the VPN network interface 131 is included in the VPN tunnel (or whether the packet bypasses the VPN tunnel) based on the security rule 171. A method of determining whether the packet is included in the VPN tunnel according to an example embodiment is described in detail hereinafter with reference to FIG. 2. Each "module" herein may comprise circuitry.

The including of the packet in the VPN tunnel according to an example embodiment may include processing the packet based on a protocol regarding the VPN tunnel and/or transmitting the packet through the VPN tunnel.

The split module 151 according to an example embodiment may transmit the packet not included in the VPN tunnel (e.g., the packet bypassing the VPN tunnel) to the encapsulation module 152. The encapsulation module 152 according to an example embodiment may include a module for encapsulating the received packet. The encapsulating of the packet according to an example embodiment is described below in detail with reference to FIG. 8.

The encryption/decryption module 153 according to an example embodiment may receive and encrypt the packet included in the VPN tunnel. The encryption/decryption module 153 according to an example embodiment may receive the packet determined by the split module 151 to be included in the VPN tunnel. The encryption/decryption module 153 according to an example embodiment may transmit the packet included in the VPN tunnel to the wired/wireless communication interface 132.

The update server 170 according to an example embodiment may include a server that stores and updates the security rule 171. The terminal 190 may check whether the security rule 171 is updated in the update server 170 and may, when updated, receive the updated security rule from the server 170 and update the security rule 171. In this case, the update server 170 may transmit the security rule 171 to the split module 151.

Figure 2:
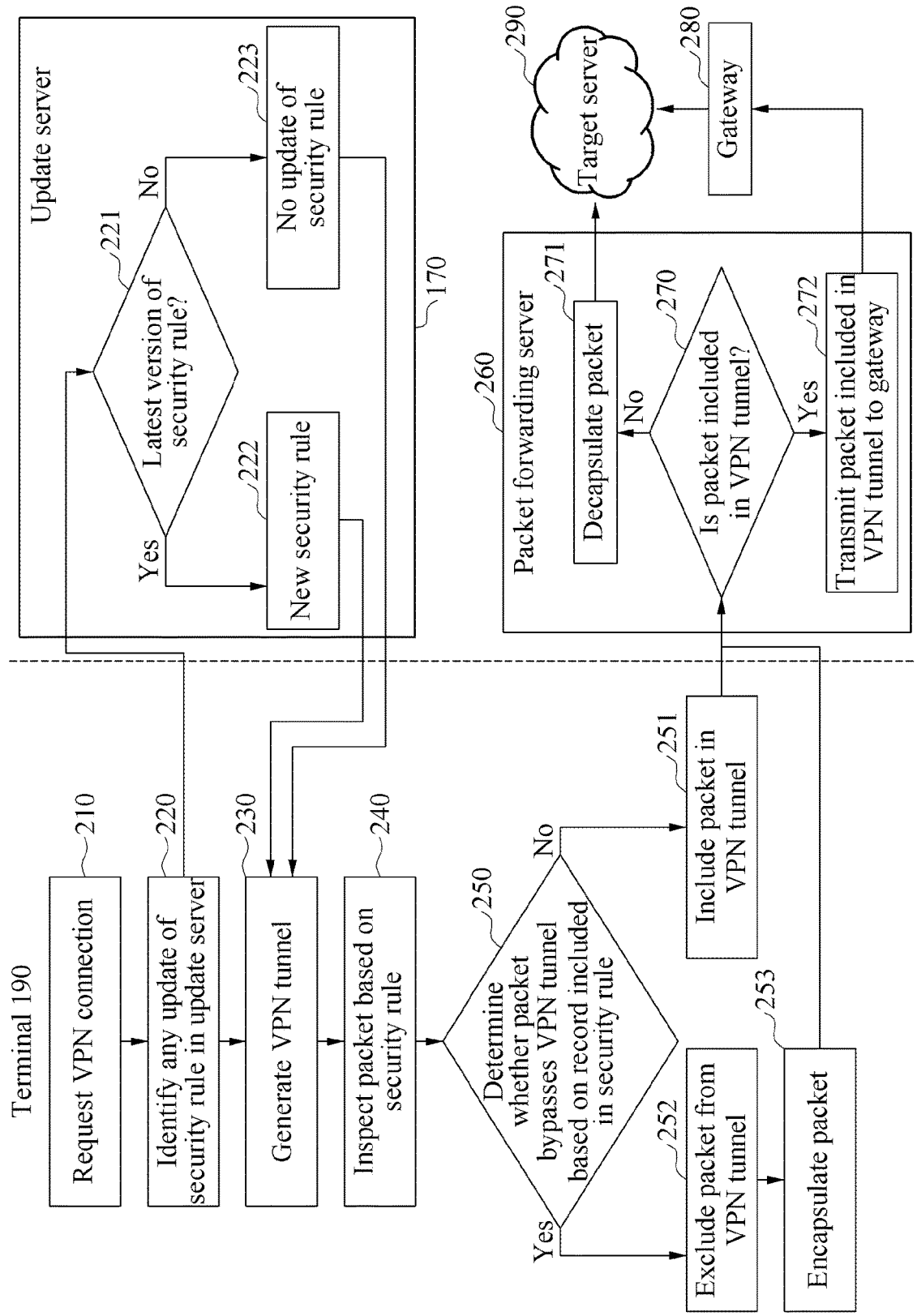
FIG. 2 is a flowchart illustrating split tunneling according to an example embodiment.

FIG. 2 is a flowchart illustrating split tunneling according to an example embodiment.

A processor 1020 (e.g., the processor 1020 of FIG. 10) of an electronic device 1001 (e.g., the terminal 190 of FIG. 1 and the electronic device 1001 of FIG. 10) according to an example embodiment may send a VPN request for connection in operation 210. The VPN according to an example embodiment may include a private communication network, which a company or several organizations use through a public network for a communication without exposing internal information to the outside.

The processor 1020 according to an example embodiment may send a packet forwarding server 260 a request for a VPN connection to establish the VPN connection. The establishing of the VPN connection according to an example embodiment may include establishing a VPN session. The establishing of the VPN session according to an example embodiment may include a public key and/or private key-based authentication process between the VPN server and the terminal 190. Accordingly, the VPN session between the VPN server and the terminal may be established upon completion of the authentication process.

The processor 1020 according to an example embodiment may check whether a security rule is updated in an update server 170 in operation 220. The update server 170 according to an example embodiment may check from the processor 1020 whether the security rule currently held by the terminal 190 is a latest version of the security rule in operation 221. When a new security rule according to an example embodiment exists in operation 222, the update server 170 may transmit the new security rule to the processor 1020. The processor 1020 may receive the new security rule and update the security rule. There may be a case in which there is no update on the security rule in operation 223 according to an example embodiment. In this case, the update server 170 may transmit a signal to the processor 1020 indicating that there is no new security rule and no update on the security rule is required.

The security rule according to an example embodiment may include a rule for determining whether a packet is included in the VPN tunnel or whether the packet bypasses the VPN tunnel. The security rule according to an example embodiment may include a rule for determining whether the packet is included in the VPN tunnel or whether the packet bypasses the VPN tunnel, based on protocol information included in the packet.

The processor 1020 according to an example embodiment may acquire the security rule for supporting split tunneling. The terminal 190 according to an example embodiment may obtain the security rule for supporting split tunneling from the update server 170. Split tunneling according to an example embodiment may include a method in which only some traffic passes through the VPN tunnel and the other traffic is transmitted through the Internet. Split tunneling according to an example embodiment may include a method in which only designated interesting traffic is included in a tunnel and passes through a gateway while the other traffic is not included in the tunnel. Traffic according to an example embodiment may refer to the amount of data moving across a network device for a predetermined time.

The processor 1020 according to an example embodiment may create the VPN tunnel in operation 230. The VPN tunnel according to an example embodiment may serve as a role of protecting data being transmitted to prevent or reduce the likelihood of an outsider from accessing a connection between the electronic device 1001 and a server 1008 (e.g., the server 1008 of FIG. 10). The VPN tunnel according to an example embodiment may be implemented by using a protocol for supporting tunneling. The protocol for supporting tunneling according to an example embodiment may include at least one of a point to point tunneling protocol (PPTP), a layer 2 tunneling protocol L2TP, a layer 2 forwarding protocol L2F, an IP security protocol IPSec, a multiprotocol label switching MPLS, a generic routing encapsulation GRE and/or a secure sockets layer SSL VPN protocol.

The processor 1020 according to an example embodiment may inspect a packet based on the security rule in operation 240. The processor 1020 according to an example embodiment may determine whether the packet is included in the VPN tunnel or bypasses the VPN tunnel, based on a plurality of records included in the security rule, in operation 250.

When the packet according to an example embodiment bypasses the VPN tunnel, the processor 1020 may not include the packet in the VPN tunnel in operation 252. When the packet according to an example embodiment bypasses the VPN tunnel, the processor 1020 may encapsulate the packet using the encapsulation module 152 in operation 253. The encapsulated packet according to an example embodiment may be transmitted to the packet forwarding server 260. The encapsulating according to an example embodiment may include adding a header to data received from another communication layer (e.g., the data received from an upper communication layer in an open systems interconnection model (OSI)) and setting the received data as a payload. The encapsulating according to an example embodiment may include hiding received information from a higher communication layer. For example, when data is transmitted from an application layer to a transport layer, the encapsulating of adding a user datagram protocol (UDP) header may be in progress. As another example, the encapsulating of adding an IP header may be in progress in the process of data being transmitted from the transport layer to a network layer.

The encapsulating according to an example embodiment may include adding, to the packet, an element including an address of the packet forwarding server 260. The processor 1020 according to an example embodiment may encapsulate the packet by generating data, using an element including the address of the packet forwarding server 260 as the header and the existing packet as the payload. The processor 1020 according to an example embodiment may set the address of the packet forwarding server 260 as a destination address in the element. Based on such a setting, the processor 1020 may transmit the packet to the packet forwarding server 260. The destination address according to an example embodiment may include an IP address of a packet destination.

When the packet according to an example embodiment is included in the VPN tunnel in operation 251, the processor may transmit the packet included in the VPN tunnel to the packet forwarding server 260.

The packet forwarding server 260 according to an example embodiment may include a server for transmitting data received from the terminal 190 (or the electronic device 1001) to a target server 290 and/or a gateway 280. The packet forwarding server 260 according to an example embodiment may change a source address of the packet to an address of the packet forwarding server 260. The source address according to an example embodiment may include an IP address of the source, which may prevent or reduce the likelihood of the target server 290 receiving the packet from identifying which electronic device the packet is from. Since the source address of the packet is the address of the packet forwarding server 260, the target server 290 may not identify the IP address of the electronic device that has transmitted the packet. The packet forwarding server 260 according to an example embodiment may change the source address of the encapsulated packet and/or the packet included in the VPN tunnel to the address of the packet forwarding server 260. The processor 1020 according to an example embodiment may change the source address of the encapsulated packet and/or the packet included in the VPN tunnel to the address of the packet forwarding server 260.

The packet forwarding server 260 according to an example embodiment may determine whether the packet is included in the VPN tunnel in operation 270. When the packet according to an example embodiment is included in the VPN tunnel, the packet forwarding server 260 may transmit the packet included in the VPN tunnel to the gateway 280 in operation 272. The gateway 280 according to an example embodiment may include a computer or software that enables a communication between networks using different communication networks and/or protocols in a computer network. The gateway 280 according to an example embodiment may include a VPN gateway. The VPN gateway according to an example embodiment may exist in various forms, such as a firewall, a server, and/or a router. When the packet according to an example embodiment is encapsulated, the processor 1020 may decapsulate the packet in operation 271. The processor 1020 according to an example embodiment may release (e.g., decapsulate) the encapsulated packet. Decapsulating according to an example embodiment may include removing the added element by using the encapsulation module 152 in the terminal 190. For example, the encapsulation module 152 may add the element including the address of the packet forwarding server 260 to the packet. The packet forwarding server 260 may remove the added element to decapsulate the packet. The packet forwarding server 260 according to an example embodiment may transmit the decapsulated packet to the target server 290. The target server 290 according to an example embodiment may include a server which serves as a destination of the packet to be transmitted.

The processor 1020 according to an example embodiment may determine whether the packet is included in the VPN tunnel or bypasses the VPN tunnel, based on the security rule. The processor 1020 according to an example embodiment may compare a first value to information based on a first offset in a first element of the packet, based on a first record included in the security rule and, based thereon, determine whether to perform a first operation related to the packet bypassing the VPN tunnel. The packet bypassing the VPN tunnel according to an example embodiment may indicate the packet being excluded from the VPN tunnel.

A record according to an example embodiment may include data including information necessary to determine the security rule. The processor 1020 according to an example embodiment may use the record to determine whether the packet bypasses the VPN tunnel. The determining of whether the packet bypasses the VPN tunnel according to an example embodiment may include determining whether the packet bypasses the VPN tunnel or is included in the VPN tunnel.

The security rule according to an example embodiment may include a plurality of records. For example, the plurality of records may be expressed as a first record, a second record, a third record, . . . , and a $n^{th}$ record. The record according to an example embodiment may include information about an operation to be executed when at least some of target location information, offset information, a protocol information value, a comparison operator, and/or an execution condition are satisfied.

The target location information according to an example embodiment may include location information related to the packet, which is a target for determining whether to bypass the VPN tunnel. The target location information according to an example embodiment may include location information of an element, which is in the packet and is a target for determining whether to bypass the VPN tunnel.

The offset information according to an example embodiment may include information necessary to identify protocol information in the packet. The offset information according to an example embodiment may include information necessary to identify protocol information in the element of the packet. Accordingly, the processor 1020 may use the offset information to identify the protocol information in the packet.

The protocol information value according to an example embodiment may include protocol information for determining whether the packet bypasses the VPN tunnel. For example, when the protocol information included in the packet is the same as the protocol information value included in the record, the processor 1020 may determine whether to cause the packet to bypass the VPN tunnel or to indicate a next record. As another example, when the protocol information included in the packet is the same as the protocol information value included in the record, the processor 1020 may determine whether to include the packet in the VPN tunnel or to indicate the next record.

The comparison operator according to an example embodiment may include an operator for comparing the protocol information included in the packet to the protocol information value included in the record.

When the protocol information included in the packet is the same as the protocol information value included in the record, information about an operation to be executed when an execution condition is satisfied according to an example embodiment may include including the packet in the VPN tunnel, instructing that the packet bypass the VPN tunnel, or indicating the next record. The information related to the operation to be executed when the execution condition is satisfied according to an example embodiment may be determined based on a value obtained by the comparison operator.

The element according to an example embodiment may include at least some of data included in the packet.

The first element according to an example embodiment may include at least some of data included in the packet. The first element according to an example embodiment may include protocol identification information. For example, the first element may include an IP header. A header according to an example embodiment may include supplemental data located in front of a data block stored or transmitted (e.g., a payload). The header according to an example embodiment may include information for identifying a source and destination of the packet and the payload may include transmitted data. Since the header according to an example embodiment is used only in a transmission process, the header may be removed from the packet upon arrival at the destination. Accordingly, the payload may include data received from the destination (e.g., a target server, a communication device, a target communication layer, etc.).

An offset according to an example embodiment may include a displacement difference from the beginning of an object to a given element or point within the same object. The offset according to an example embodiment may include location information related to the packet. The offset according to an example embodiment may include a displacement difference from a reference point to an address where a target packet exists. The offset according to another embodiment may include information about where protocol information is located in the packet. For example, the offset may include a displacement difference from a specific address of the target packet to a start address where the protocol information exists.

The first offset according to an example embodiment may include information about where information for determining whether the packet bypasses the VPN tunnel is located in the first element, which is a target of the record. The processor 1020 may use the first offset to identify, in the first element, the information for determining whether the packet bypasses the VPN tunnel. For example, the first offset may include information about a protocol ID location when the first element is an IP header. The processor according to an example embodiment may determine whether to bypass the VPN tunnel by comparing a first value to a protocol ID value of the target packet based on the first offset.

The protocol information value according to an example embodiment may include a value in which protocol information is expressed in figures. The protocol information value according to an example embodiment may represent a value expressing the protocol information in a binary format. The protocol information value according to an example embodiment may include information about a protocol, which is subject to bypassing the VPN tunnel. The protocol information value according to an example embodiment may include information about a protocol, which is subject to being included in the VPN tunnel. The processor 1020 according to an example embodiment may determine whether information related to the protocol included in the packet is subject to bypassing the VPN tunnel or being included in the VPN tunnel, based on the protocol information value. The protocol information value according to an example embodiment may be expressed in various values, such as a first value, a second value, a third value, ..., a $n^{th}$ value.

The first value according to an example embodiment may include protocol information for determining whether the packet bypasses the VPN tunnel. For example, when the first element is an IP header, the first value may include a protocol ID value that is subject to bypassing the VPN tunnel.

The protocol according to an example embodiment may include a standardized communication protocol to facilitate the exchange of data between different electronic devices. The protocol according to an example embodiment may include a system of rules and patterns for exchanging messages between a computer or a telecommunication device. The protocol according to an example embodiment may include functions of signal system, authentication, error detection and/or correction.

Protocol information according to an example embodiment may include protocol-related information. The protocol information according to an example embodiment may include at least some of protocol identification information, a port number, a header type, and/or protocol version information.

The protocol identification information according to an example embodiment may include information for identifying a protocol. The protocol identification information according to an example embodiment may include higher layer protocol identification information included in the packet. For example, the protocol identification information may include a protocol ID. The processor 1020 according to an example embodiment may determine whether the packet bypasses the VPN tunnel or is included in the VPN tunnel, based on only the protocol identification information.

The port number according to an example embodiment may include a number corresponding to a protocol. The port number according to an example embodiment may include information about a process for receiving data. Therefore, the processor 1020 may send data to a specific process using the port number.

A header type according to an example embodiment may include information about a header type of the protocol. The header type according to an example embodiment may be determined based on the length of the header. For example, the header type of a UDP header may include information related to the UDP header type. As another example, when the UDP header is greater than 8 bytes, the header type may include a long-type header.

Protocol version information according to an example embodiment may include information about a protocol version. For example, when a protocol is transport layer security (TLS), the protocol version information may include a version of TLS. For example, there may be TLS 1.0, TLS 1.1, and TLS 1.2 versions.

The first operation according to an example embodiment may include an operation related to the packet bypassing the VPN tunnel in response to the first record. The first operation according to an example embodiment may include an operation for determining whether the packet bypasses the VPN tunnel without being included in the VPN tunnel or whether the packet is included in the VPN tunnel. The first operation according to an example embodiment may include instructing that the packet bypass the VPN tunnel, including the packet in the VPN tunnel, and/or indicating the next record (or instructing that another element in the packet be inspected).

The processor 1020 according to an example embodiment may perform the first operation based on whether a condition for executing the first operation is satisfied. For example, the processor 1020 may determine whether the packet bypasses the VPN tunnel by comparing the first value to a value obtained based on information included in the first offset of the first element, based on the first record.

The processor 1020 according to an example embodiment may cause the packet to bypass the VPN tunnel when the condition for performing the first operation is satisfied. For example, when the value obtained based on the information included in the first offset is the same as the first value, the processor 1020 may cause the packet to bypass the VPN tunnel. The processor 1020 according to an example embodiment may indicate a next record (or instruct that another element in the packet be inspected, for example, the second element not the first element) to identify additional information even when the value obtained based on the information included in the first offset is the same as the first value. For example, the processor 1020 may indicate the next record when the protocol ID is identified, but the port number of the corresponding protocol is required to determine whether the packet bypasses the VPN tunnel. In this case, the processor 1020 may examine the second element. For example, the processor 1020 may determine whether to perform a second operation by comparing the second value to information included in a second offset in a second element of the packet based on the second record.

When the condition for performing the first operation according to an example embodiment is not satisfied, the processor 1020 may include the packet in the VPN tunnel. For example, when the value obtained based on the information included in the first offset is different from the first value, the processor 1020 may include the packet in the VPN tunnel. When the information included in the first offset is different from the first value, it may indicate that the packet is not subject to bypassing the VPN tunnel.

The processor 1020 according to an example embodiment may differently perform an operation to be executed when an execution condition is satisfied. The operation to be executed when the execution condition is satisfied according to an example embodiment may be determined based on the record included in the security rule. When the condition for performing the first operation is satisfied, the processor 1020 according to an example embodiment may include the packet in the VPN tunnel. For example, when the value obtained based on the information included in the first offset is the same as the first value, the processor 1020 may include the packet in the VPN tunnel.

When the first operation instructs that the second record included in the security rule be executed, the processor 1020 according to an example embodiment may compare the second value to information based on the second offset in the second element of the packet based on the second record and then determine whether to perform the second operation related to the packet bypassing the VPN tunnel. The second record according to an example embodiment may include a next record of the first record.

The second element according to an example embodiment may include at least some of data included in the packet. The second element according to an example embodiment may include a payload corresponding to the first element (e.g., a header). For example, when the first element is an IP header, the second element may be an IP payload. As another example, when the first element is an IP header, the second element may include a transmission control protocol (TCP) header included in the IP payload.

The second element according to an example embodiment may include data generated in a communication layer higher than the first element. For example, the first element may be an added header in a network layer. In this case, the second element may be data generated in a transport layer, which is a higher layer than the network layer. For example, when the first element is the IP header, the second element may include data related to the TCP and/or the UDP.

The second offset according to an example embodiment may include, in the second element of the packet which is a target of the second record, information about where information is located for determining whether the packet is included in the VPN tunnel or the packet bypasses the VPN tunnel. The processor 1020 according to an example embodiment may use the second offset to identify, in the second element, information necessary to determine whether the packet bypasses the VPN tunnel. For example, the second offset may include information about a port number location when the second element is the TCP header. The processor 1020 according to an example embodiment may determine whether the packet bypasses the VPN tunnel by comparing the port number of a target packet to the second value based on the second offset.

The second value according to an example embodiment may include protocol information for determining whether the packet bypasses the VPN tunnel. For example, the second value may include the port number to cause the packet to bypass the VPN tunnel when the second element is the TCP header.

The second operation according to an example embodiment may include an operation related to the packet bypassing the VPN tunnel. When the execution condition for the first operation or the second condition is satisfied, the second operation according to an example embodiment may include instructing that the packet bypass the VPN tunnel, including the packet in the VPN tunnel, and/or indicating the next record. For example, the second operation in the second record may be an operation of instructing that the packet bypass the VPN tunnel. In this case, when a value obtained based on the information included in the second offset is the same as a second value, the processor 1020 may cause the packet to bypass the VPN tunnel based on the second record. The second operation in the second record according to an example embodiment may be an operation of indicating the next record. When the value obtained based on the information included in the second offset is the same as the second value, the processor 1020 according to an example embodiment may indicate the next record to identify additional information. For example, the processor 1020 may indicate the next record when it is confirmed that the port number obtained based on the information included in the second offset is the same as the second value but information about a protocol version is needed to determine whether the packet bypasses the VPN tunnel. In this case, the processor 1020 may determine whether the packet bypasses the VPN tunnel by comparing a third value to a value obtained based on information included in a third offset in a third element of the packet based on the third record.

When a condition for performing the first operation or the second operation according to an example embodiment is not satisfied, the processor 1020 may include the packet in the VPN tunnel and transmit the packet to the packet forwarding server. For example, when the packet does not match the second record, the processor 1020 may include the packet in the VPN tunnel. For example, when a value (e.g., a port number) obtained based on the information included in the second offset is different from a second value, the processor 1020 may include the packet in the VPN tunnel. When the value obtained based on the information included in the second offset is different from the second value, the packet may not be subject to bypassing the VPN tunnel.

When the first operation or the second operation instructs that the packet bypass the VPN tunnel, the processor 1020 according to an example embodiment may encapsulate the packet while excluding the packet from the VPN tunnel and transmit the encapsulated packet to the packet forwarding server.

When the packet according to an example embodiment is included in the VPN tunnel, the packet may be encrypted. The VPN tunnel according to an example embodiment may be implemented by using a protocol for supporting tunneling.

There may be a case in which the second operation according to an example embodiment includes an operation of indicating the third record. When a condition for performing the first operation or the second operation according to an example embodiment is satisfied and the second operation instruct that the third record included in the security rule be executed, a third value may be compared to information based on a third offset in a third element of the packet based on the third record, thereby checking a condition for performing the third operation related to the packet bypassing the VPN tunnel. The third record according to an example embodiment may include the next record of the second record.

There may be a case in which the second operation according to an example embodiment includes including the packet in the VPN tunnel. The processor 1020 according to an example embodiment may include the packet in the VPN tunnel when the condition for performing the first operation or the second operation is satisfied. For example, when a value obtained based on the information included in the second offset is the same as a second value, the processor 1020 may include the packet in the VPN tunnel.

The third element according to an example embodiment may include at least some of data included in the packet. For example, the third element may be a payload corresponding to the second element. For example, when the second element is a TCP header, the third element may include a TCP payload.

The third offset according to an example embodiment may include, in the third element of the packet which is a target for the third record, information about where information is located for determining whether the packet bypasses the VPN tunnel. The processor 1020 according to an example embodiment may use the third offset to identify, in the third element, information necessary to determine whether the packet bypasses the VPN tunnel. For example, the third offset may include information about where protocol version information is located when the third element is a TCP payload. The processor 1020 according to an example embodiment may determine whether the packet bypasses the VPN tunnel by comparing a third value to protocol version information of the packet based on the third offset.

The third value according to an example embodiment may include protocol information for determining whether the packet bypasses the VPN tunnel. For example, the third value may include information about a version of a protocol for bypassing the VPN tunnel when the third element is a TCP payload. For example, TLS 1.2 may be a version of a protocol for bypassing the VPN tunnel. In this case, the processor 1020 may perform the third operation. The third operation may instruct that an applicable packet bypass the VPN tunnel. In this case, the processor 1020 may encapsulate the applicable packet and transmit the encapsulated applicable packet to the packet forwarding server.

The third operation according to an example embodiment may include indicating another record included in the security rule, instructing that the packet bypass the VPN tunnel, and/or including the packet in the VPN tunnel. Accordingly, when an additional determination is required to determine whether the packet bypasses the VPN tunnel, the third operation may instruct that another record (e.g., the fourth record) included in the security rule be executed. As another example, TLS 1.0 may not be a version of a protocol for bypassing the VPN tunnel. In this case, the packet may not match the third record. When the packet does not match the third record, the processor 1020 may include the packet in the VPN tunnel. The processor 1020 according to an example embodiment may include the packet in the VPN tunnel and transmit the packet to the packet forwarding server.

The processor 1020 according to an example embodiment may encapsulate the packet while excluding the packet from the VPN tunnel and transmit the capsulated packet to the packet forwarding server when the condition for performing the first operation, the second operation, or the third operation is satisfied and the first operation, the second operation, or the third operation in the first record, the second record, or the third record instructs that the packet bypass the VPN tunnel. When the condition for performing the first operation, the second operation, or the third operation is not satisfied, the processor 1020 according to an example embodiment may include the packet in the VPN tunnel and transmit the packet to the packet forwarding server.

When the condition for performing the first operation, the second operation, or the third operation is satisfied and the first operation, the second operation, or the third operation in the first record, the second record, or the third record instructs that the packet be included in the VPN tunnel, the processor 1020 according to an example embodiment may include the packet in the VPN tunnel and transmit the packet to the packet forwarding server. The processor 1020 according to an example embodiment may instruct that the packet bypass the VPN tunnel when the condition for performing the first operation, the second operation, or the third operation is not satisfied.

Figure 3:
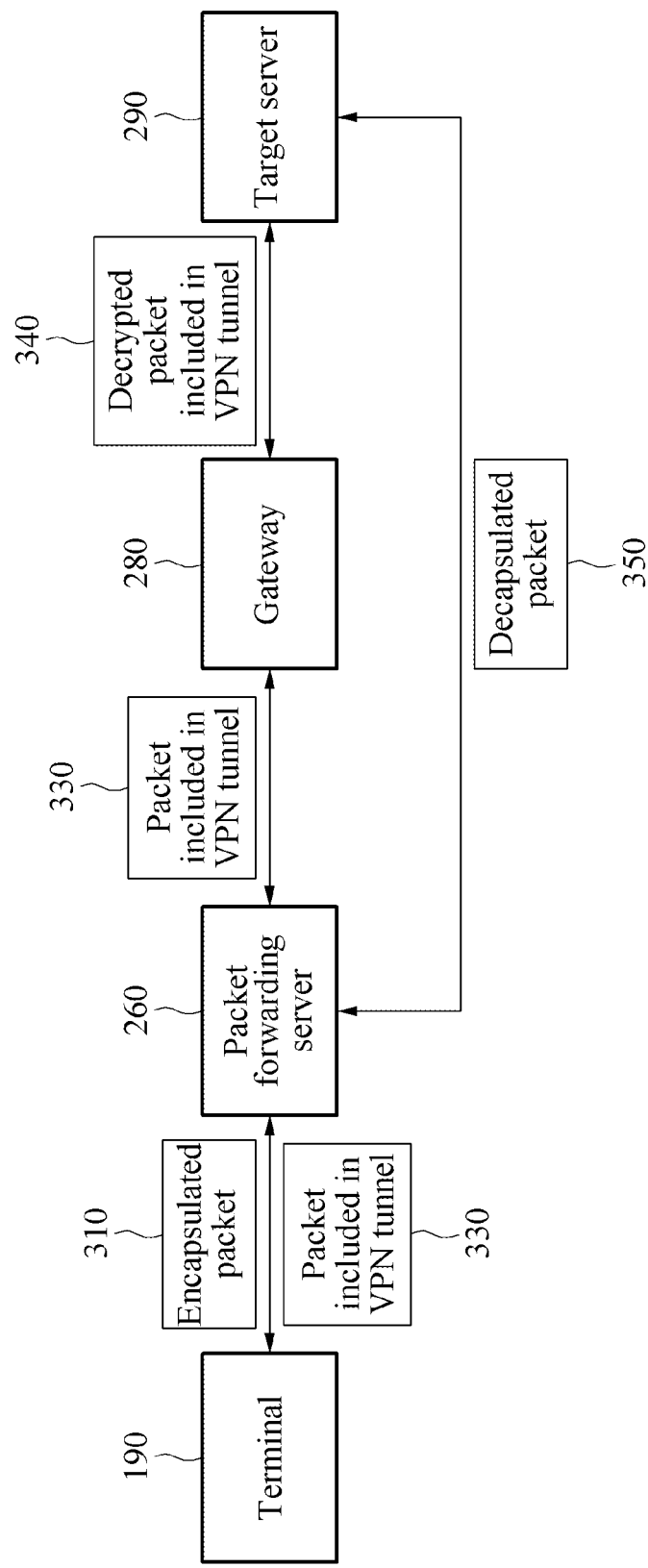
FIG. 3 is a block diagram illustrating a process of transmitting a packet according to an example embodiment.

FIG. 3 is a block diagram illustrating a process of transmitting a packet according to an example embodiment.

FIG. 3 illustrates a terminal 190, a packet forwarding server 260, a gateway 280, a target server 290, an encapsulated packet 310, a packet 330 included in the VPN tunnel, and/or a decapsulated packet 350.

The terminal 190 according to an example embodiment may transmit the encapsulated packet 310 and/or the packet 330 included in the VPN tunnel to the packet forwarding server 260.

The packet forwarding server 260 according to an example embodiment may transmit the packet 330 included in the VPN tunnel to the gateway 280. The gateway 280 according to an example embodiment may decrypt the received packet 330 included in the VPN tunnel and then transmit the decrypted packet 340 included in the VPN tunnel to the target server 290.

The packet forwarding server 260 according to an example embodiment may decapsulate the encapsulated packet 310. The packet forwarding server 260 according to an example embodiment may transmit the decapsulated packet 350 to the target server 290.

Figure 4:
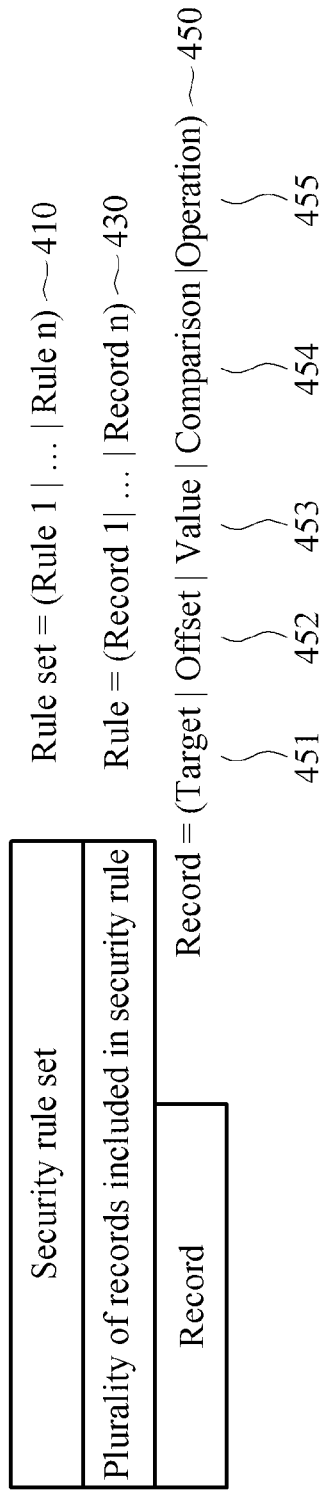
FIG. 4 is a diagram illustrating a security rule according to an example embodiment.

FIG. 4 is a diagram illustrating a security rule according to an example embodiment.

FIG. 4 illustrates a security rule set 410 (indicated as Rule set in FIG. 4), a plurality of records 430 included in the security rule (indicated as Rules in FIG. 4), a record 450 (indicated as Rules in FIG. 4), target location information 451, offset information 452, a protocol information value 453, a comparison operator 454, and/or information about an operation 455 to be executed when a execution condition is satisfied.

The security rule set 410 according to an example embodiment may include a plurality of security rules. The security rule set 410 according to an example embodiment may include security rules respectively corresponding to a plurality of protocols. The security rule set 410 according to an example embodiment may be updated by the update server 170 and/or the terminal 190.

The security rule according to an example embodiment may include a rule for determining whether a packet is included in the VPN tunnel or bypasses the VPN tunnel, based on protocol information included in the packet. The security rule according to an example embodiment may include a plurality of records.

The security rule according to an example embodiment may include a process of identifying various pieces of information in the packet to determine whether the packet is included in the VPN tunnel or bypasses the VPN tunnel, based on the protocol information. For example, when a protocol has a high reliability due to its high security level, the packet following the protocol may bypass the VPN tunnel. Therefore, the security rule may be set as "when a packet follows a protocol with high reliability, the packet bypasses the VPN tunnel". Accordingly, the security rule may include the plurality of records for determining whether a protocol has high reliability. The security rule may include the plurality of records to be able to sequentially identify various pieces of information in the packet.

The security rule according to an example embodiment may include identifying various pieces of information in the packet to determine whether the packet is included in the VPN tunnel, based on the protocol information. For example, when a protocol has a low security level and thus has many security vulnerabilities, the packet needs to be included in the VPN tunnel. Accordingly, the security rule may include the plurality of records for determining whether the protocol has many security vulnerabilities.

The record 450 according to an example embodiment may include data including information necessary to determine the security rule. The processor 1020 according to an example embodiment may determine whether the packet bypasses the VPN tunnel based on the record 450. The security rule according to an example embodiment may include many records. For example, each of records may be expressed as a first record, a second record, a third record, . . . , and an $n^{th}$ record.

The record 450 according to an example embodiment may include the target location information 451, the offset information 452, the protocol information value 453, the comparison operator 454, and/or the information 455 related to the operation to be executed when the execution condition is satisfied. The target location information 451 according to an example embodiment may include location information about a packet which is subject to a determination of whether the packet bypasses the VPN tunnel. The offset information 452 according to an example embodiment may include information necessary to identify protocol information in the packet. Accordingly, the processor 1020 may identify protocol information in the packet based on the offset information 452. The protocol information value 453 according to an example embodiment may include protocol information related to bypassing the VPN tunnel. For example, when the protocol information included in the packet is the same as a protocol information value included in a record, the processor 1020 may determine whether the packet bypasses the VPN tunnel or whether to instruct that a next record be executed. The comparison operator 454 according to an example embodiment may include an operator for comparing protocol information included in the packet to a protocol information value included in a record. Accordingly, the processor 1020 may use the comparison operator 454 to determine whether an execution condition is satisfied. For example, when a protocol information value (e.g., a first value, a second value, . . . , a $n^{th}$ value) corresponding to a record is the same as protocol information included in the packet, the processor 1020 may determine that the execution condition is satisfied. As another example, when the protocol information value corresponding to the record is different from the protocol information included in the packet, the processor 1020 may determine that the execution condition is not satisfied.

The information 455 related to the operation to be executed when the execution condition is satisfied according to an example embodiment may include information about an operation related to the packet bypassing the VPN tunnel. When the execution condition is satisfied, the information 455 related to the operation to be executed when the execution condition is satisfied according to an example embodiment may set an operation to be executed in various manners. The operation to be performed when the execution condition is satisfied according to an example embodiment may include causing the packet to bypass the VPN tunnel, including the packet in the VPN tunnel, and/or instructing that the next record be executed. For example, when the execution condition is satisfied, the processor 1020 may cause the packet to bypass the VPN tunnel. As another example, when the execution condition is satisfied, the processor 1020 may include the packet in the VPN tunnel. As another example, when the execution condition is satisfied, the processor 1020 may instruct that the next record be executed. The operation determined based on the information related to the operation to be executed when the execution condition is satisfied according to an example embodiment may be expressed as the first operation, the second operation, . . . , and the $n^{th}$ operation, each expression corresponding to one of each of the records.

When protocol information included in a packet according to an example embodiment is the same as a protocol information value included in a record, the packet may be caused to bypass the VPN tunnel or the next record may be executed. The information 455 related to the operation to be executed when the execution condition is satisfied according to an example embodiment may be determined based on a value obtained through the comparison operator 454. When protocol information included in the packet according to an example embodiment is different from the protocol information value included in the record, the processor 1020 may include the packet in the VPN tunnel.

The information 455 related to the operation to be executed when the execution condition is satisfied according to an example embodiment may include including the packet in the VPN tunnel or instructing that the next record be executed when the protocol information included in the packet is the same as the protocol information value. For example, a certain protocol may have security vulnerabilities. Therefore, the certain protocol may need to be included in the VPN tunnel. Accordingly, the processor 1020 may identify such a protocol and include the packet following the protocol in the VPN tunnel.

Figure 5:
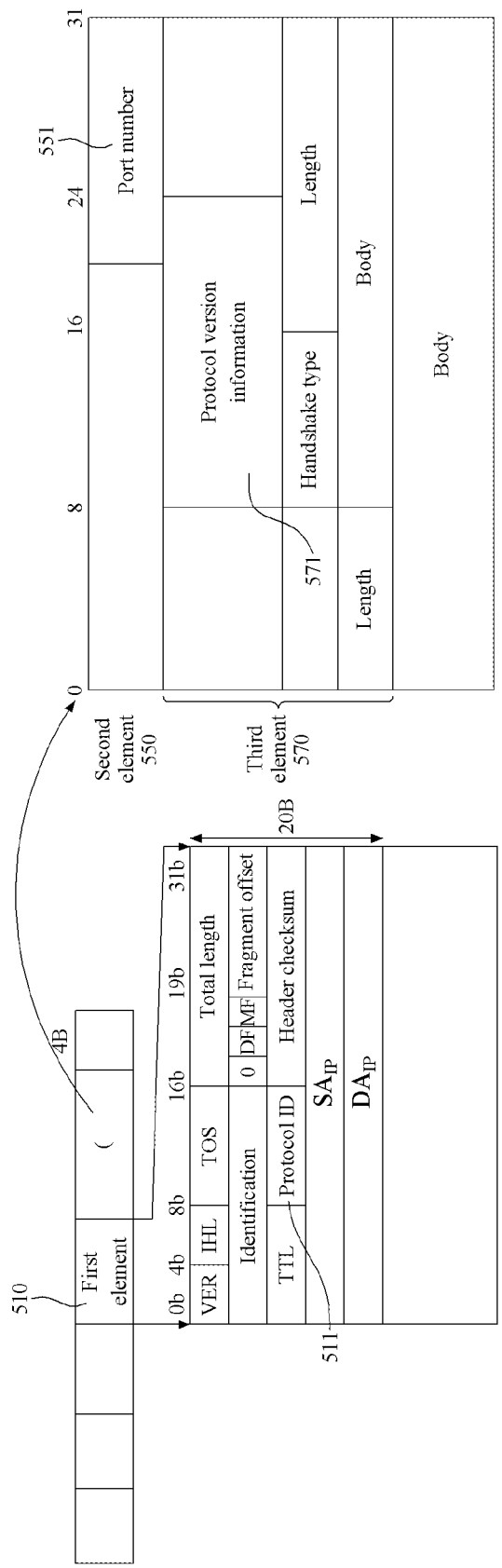
FIG. 5 is a diagram illustrating a process of determining whether a packet bypasses a VPN tunnel based on a packet structure according to an example embodiment.

FIG. 5 is a diagram illustrating a process of determining whether a packet bypasses a VPN tunnel based on a packet structure, according to an example embodiment.

FIG. 5 illustrates a first element 510, protocol identification information 511, a second element 550, a port number 551, a third element 570, and protocol version information 571.

The first element 510 according to an example embodiment may include at least some of data included in a packet. The first element 510 according to an example embodiment may include the protocol identification information 511. For example, the first element 510 may include an IP header. The IP header may include an IP version (indicated as VER in FIG. 5, for example, IPv4 and IPv6), header length (IHL) which is a length occupied by a header in an IP packet, type of service (ToS) including content about a quality of a service that an IP protocol provides to a user, total length which is a total length of the packet, identification that performs a packet delimiter function designated by a transmission host (used when split packet is re-combined), flags (indicated as 0 in FIG. 5) including control information about packet split, data frame (DF) indicating whether a packet may be split, MF indicating a last packet among split packets, fragment Offset which is a relative address value located in data before a packet is split, Time to Live (TTL) which is a time that may be used with an applicable packet on the Internet, the protocol identification information 511, header checksum for correcting an error which occurs in a header, a source address (indicated as SA in FIG. 5) which is an IP address of a transmission host, and/or a destination address (indicated as DAI in FIG. 5) which is an IP address of a receiving host.

The protocol identification information 511 according to an example embodiment may include information for identifying a protocol. For example, the protocol identification information 511 may include a protocol ID. The protocol ID may include a protocol ID of a higher layer. For example, when the first element is an IP header, the protocol ID may include the TCP or the UDP.

A first operation according to an example embodiment may include an operation related to a packet bypassing the VPN tunnel. The first operation according to an example embodiment may include determining whether the packet bypasses the VPN tunnel without the packet being included in the VPN tunnel. The first operation according to an example embodiment may include instructing that the packet bypass the VPN tunnel and/or instructing that a next record be executed. The first operation according to an example embodiment may include instructing that the next record be executed. For example, when the next record after the first record is the second record, the first operation may include instructing that the second record be executed.

The processor 1020 according to an example embodiment may perform an operation related to bypassing the VPN tunnel by comparing a second value included in the second record to the port number 551 included in the second element. For example, when the second value is the same as the port number 551, the processor 1020 may instruct that the packet bypass the VPN tunnel or instruct that the next record be executed.

The second element 550 according to an example embodiment may include at least some of data included in the packet. For example, when the first element 510 is an IP header, the second element 550 may include a TCP header included in the IP payload. The second element 550 according to an example embodiment may include the port number 551. For example, the port number 551 may include a sequence port number and/or a destination port number.

When the second operation according to an example embodiment instructs that the next record be executed, the processor 1020 may compare a third value to the protocol version information 571 included in the third element 570 based on the third record to check a condition for executing the third operation related to bypassing the VPN tunnel. The third value according to an example embodiment may include protocol information for determining whether the packet bypasses the VPN tunnel.

The third element 570 according to an example embodiment may include at least some of data included in the packet. For example, the third element 570 may be a payload corresponding to the second element 550. For example, when the second element 550 is a TCP header, the third element 570 may include a TCP payload.

FIGS. 6A to 6C are diagrams illustrating various security rules according to an example embodiment.

All of FIGS. 6A to 6C include the target location information 451, the offset information 452, the protocol information value 453, the comparison operator 454, and/or the information 455 related to the operation to be performed when the execution condition is satisfied, all of which is described in FIG. 4.

FIG. 6A may be a diagram illustrating a process of determining whether a packet bypasses a VPN tunnel based on TLS version information according to an example embodiment.

A processor 1020 according to an example embodiment may determine whether to perform a first operation related to a packet bypassing the VPN tunnel based on a record (record 1) 610. The processor 1020 according to an example embodiment may identify protocol identification information included in a first element 611 in a packet based on the offset information 452. For example, when the first element 611 is an IP header, "offset (offset 72) 612" may indicate that protocol identification information exists in the packet from bit 72 of the IP header. In addition, a protocol information value (or a first value) being "8 TCP port and 1 byte" 613 may indicate the 1-byte value from bit 72 of the IP header is equal to 8. When the comparison operator 454 is "Equal 614", the comparison operator 454 may include a comparison operator for determining whether the 1-byte value from bit 72 of the IP header is equal to 8. Accordingly, the first operation may include instructing that a second record be executed when the information 455 related to the operation to be executed when the execution condition is satisfied is "go to record 2" 615, and the 1-byte value from 72nd bit of the IP header is equal to 8. Accordingly, the processor 1020 may determine whether to indicate the next record, to include the packet in the VPN tunnel and/or to cause the packet to bypass the VPN tunnel, based on the second record.

The processor 1020 according to an example embodiment may determine whether to perform a second operation related to bypassing the VPN tunnel based on a record (record 2) 620. The processor 1020 according to an example embodiment may identify port information included in a second element 621 in the packet, based on the offset information 452. For example, when the second element 621 is a TCP header, "offset (offset 8) 622" may indicate that a port number exists in the packet from bit 8 of the TCP header. In addition, a protocol information (or a second value) being "443 TLS port and 2 bytes" 623 may indicate that the 2-byte value from bit 8 of the TCP header is equal to 443. When the comparison operator 454 is "equal 624", the comparison operation 454 may include a comparison operator for determining whether the 2-byte value from bit 8 of the TCP header is equal to 443. Accordingly, the second operation may include instructing that a third record be executed when the information 455 related to the operation to be executed when the execution condition is satisfied is "go to record 3", which is 625 and the 2-byte value from bit 8 of the TCP header is equal to 443. Accordingly, the processor 1020 may determine whether to indicate the next record, to include the packet in the VPN tunnel and/or to cause the packet to bypass the VPN tunnel, based on the third record.

The processor 1020 according to an example embodiment may check a condition for performing a third operation related to bypassing the VPN tunnel, based on a record (record 3) 630. The processor 1020 according to an example embodiment may identify protocol version information included in a third element 631 in the packet, based on the offset information 452. For example, when the third element 631 is a TCP payload, "offset (offset 16) 632" may indicate that the protocol version information exists in the packet from bit 16 of the TCP header. In addition, a protocol information value (or a third value) being "0x0303 TLS v1.2 and 2 bytes" 633 may indicate the 2-byte value from bit 16 of the TCP payload is equal to 0x0303. When the comparison operator 454 is "equal or higher 634", the comparison operator 454 may include a comparison operator for determining whether the 2-type value from bit 16 of the TCP payload is equal to or greater than 0x0303. Therefore, when the information 455 related to the operation to be executed when the execution condition is satisfied is "bypass 635" and the 2-type value from bit 16 of the TCP payload is equal to or greater than 0x0303, the third operation may include instructing that the packet bypass the VPN tunnel. Accordingly, the processor 1020 may encapsulate the packet while excluding the packet from the VPN tunnel.

FIG. 6B may be a diagram illustrating a process wherein a protocol with a high security level determines whether a packet bypasses a VPN tunnel, according to an example embodiment.

There may be a case where a protocol according to an example embodiment is a high-security quick UDP internet connections (QUIC) protocol.

The processor 1020 according to an example embodiment may determine whether to perform a first operation related to bypassing the VPN tunnel based on a record (record 1) 640. The processor 1020 according to an example embodiment may identify protocol identification information included in a first element 641 in the packet based on the offset information 452. For example, when the first element 641 is an IP header, "offset (offset 72) 642" may indicate that protocol identification information exists in the packet from bit 72 of the IP header. In addition, a protocol information value (or a first value) being "17 UDP port and 1 byte" 643 may indicate that the 1-byte value from bit 72 of the IP header is equal to 17. When the comparison operator 454 is "Equal 644", the comparison operator 454 may include a comparison operator for determining whether the 1-byte value from bit 72 of the IP header is equal to 17. Accordingly, when the information 455 related to the operation to be executed when the execution condition is satisfied is "go to record 2" 645 and the 1-byte value from bit 72 of the IP header is equal to 17, the first operation may include instructing that a second record be executed. Accordingly, the processor 1020 may determine whether to indicate a next record, to include the packet in the VPN tunnel and/or cause the packet to bypass the VPN tunnel, based on the second record.

The processor 1020 according to an example embodiment may determine whether to perform a second operation related to the packet bypassing the VPN tunnel, based on a record (record 2) 650. The processor 1020 according to an example embodiment may identify port information included in a second element 651 in the packet based on the offset information 452. For example, when the second element 651 is a UDP header, "offset (offset 16) 652" may indicate that a port number exists in the packet from bit 16 of the UDP header. In addition, a protocol information value (or a second value) being "443 TLS port, 2 bytes" 653 may indicate the 2-byte value from bit 16 of the UDP header is 443. When the comparison operator 454 is the "equal 654", the comparison operator 454 may include a comparison operator for determining whether the 2-byte value from bit 16 of the UDP header is equal to 443. Accordingly, when the information 455 related to the operation to be executed when the execution condition is satisfied is "go to record 3", which is 655, and the 2-byte value from bit 16 of the UDP header is the same as 443, the second operation may include indicating a third record. Accordingly, the processor 1020 may determine whether to indicate the next record, to include the packet in the VPN tunnel, and/or to cause the packet to bypass the VPN tunnel, based on the third record.

The processor 1020 according to an example embodiment may check a condition for executing a third operation related to the packet bypassing the VPN tunnel, based on a record (record 3) 660. The processor 1020 according to an example embodiment may identify a header type included in a third element 661 in the packet based on the offset information 452. For example, when the third element 661 is a UDP payload, "offset (offset 0) 662" may indicate that a header type exists in the packet from bit 0 of the UDP payload. In addition, a protocol information value (or a third value) being "1 long-type header and 1 bit" 663 may indicate the 1-bit value from bit o of the UDP payload is equal to 1. When the comparison operator 454 is "Equal 664", the comparison operator 454 may include a comparison operator for determining whether the 1-bit value from bit 0 of the UDP payload is equal to 1. Therefore, when the information 455 related to the operation to be executed when the execution condition is satisfied is "go to record 4", which is 665, and the 1-bit value from bit 0 of the UDP payload is equal to 1, the third operation may include indicating a fourth record. Accordingly, the processor 1020 may determine whether to indicate the next record, to include the packet in the VPN tunnel, and/or to cause the packet to bypass the VPN tunnel, based on the fourth record.

The processor 1020 according to an example embodiment may determine whether to perform a fourth operation related to the packet bypassing the VPN tunnel, based on a record (record 4) 670. The processor 1020 according to an example embodiment may identify protocol version information included in a fourth element 671 in the packet based on the offset information 452. For example, when the fourth element 671 is a UDP payload, "offset (offset 72) 672" may indicate that protocol version information exists in the packet from bit 72 of the UDP payload. In addition, a protocol information value (or a fourth value) being "0 version, 4 bytes" 673 may indicate the 4-byte value from bit 72 of the UDP payload is equal to 0. When the comparison operator 454 is "Equal 674", the comparison operator 454 may include a comparison operator for determining whether the 4-byte value from bit 72 of the UDP payload is equal to 0. Accordingly, when the information 455 related to the operation to be executed when the execution condition is satisfied is "bypass 675" and the 4-byte value from bit 72 of the UDP payload is equal to 0, the fourth operation may include instructing that the packet bypass the VPN tunnel. Accordingly, the processor 1020 may encapsulate the packet while excluding the packet from the VPN tunnel.

FIG. 6C may be a diagram illustrating a process wherein a protocol with a low security level determines whether a packet bypasses a VPN tunnel, according to an example embodiment.

The protocol with a low security level according to an example embodiment may include Trivial File Transfer Protocol (TFTP). TFTP according to an example embodiment may be a UDP-based file transfer protocol and include a protocol having security vulnerabilities.

The processor 1020 according to an example embodiment may determine whether to perform a first operation related to the packet bypassing the VPN tunnel, based on a record (record 1) 680. The processor 1020 according to an example embodiment may identify protocol identification information included in a first element 681 in the packet, based on the offset information 452. For example, when the first element 681 is an IP header, "offset (offset 72) 682" may indicate that protocol identification information exists in the packet from bit 72 of the IP header. In addition, a protocol information value (or a first value) being "8 TCP port and 1 byte" 683 may indicate the 1-byte value from bit 72 of the IP header is equal to 8. When the comparison operator 454 is "Equal 684", the comparison operator 454 may include a comparison operator for determining whether the 1-byte value from bit 72 of the IP header is equal to 8. Accordingly, when the information 455 related to the operation to be executed when the execution condition is satisfied is "go to record 2" 685 and the 1-byte value from bit 72 of the IP header is equal to 8, the first operation may include instructing that a second record be executed. Accordingly, the processor 1020 may determine whether to indicate the next record, to include the packet in the VPN tunnel, and/or to cause the packet to bypass the VPN tunnel, based on the second record.

The processor 1020 according to an example embodiment may determine whether to perform a second operation related to the packet bypassing the VPN tunnel, based on a record (record 2) 686. The processor 1020 according to an example embodiment may identify port information included in a second element 687 in the packet, based on the offset information 452. For example, when the second element 687 is a UDP header, "offset (offset 16) 688" may indicate that a port number exists in the packet from bit 16 of the UDP header. In addition, a protocol information value (or a second value) being "69 TFTP port and 2 bytes" 689 may indicate the 2-byte value from bit 16 of the UDP header is equal to 69. When the comparison operator 454 is "Equal 690", the comparison operator 454 may include a comparison operator for determining whether the 2-byte value from bit 16 of the UDP header is equal to 69. Accordingly, when the information 455 related to the operation to be executed when the execution condition is satisfied is "go to record 3" 691 and the 2-byte value from bit 16 of the UDP header is equal to 69, the second operation may include instructing that a third record be executed. Accordingly, the processor 1020 may determine whether to indicate the next record, to include the packet in the VPN tunnel, and/or to cause the packet to bypass the VPN tunnel, based on the third record.

The processor 1020 according to an example embodiment may check a condition for performing the third operation related to the packet bypassing the VPN tunnel, based on a record (record 3) 692. The processor 1020 according to an example embodiment may identify protocol version information included in a third element 693 in the packet based on the offset information 452. For example, when the third element 693 is a UDP payload, "offset (offset 0) 694" may indicate that protocol version information exists in the packet from bit 0 of the UDP payload. In addition, a protocol information value (or a third value) being "1-5 operation code and 2 bytes" 695 may indicate the 2-byte value from bit 16 of the TCP payload is 1 or more and 5 or less. When the comparison operator 454 is "between 1 to 5", which is 696, the comparison operator may include a comparison operator for determining whether the 2-byte value from bit 0 of the UDP payload is between 1 and 5. Accordingly, when the information 455 related to the operation to be executed when the execution condition is satisfied is "use VPN tunnel 697" and the 2-byte value from bit 0 of the UDP payload is between 1 and 5, the third operation may include including the packet in the VPN tunnel. Accordingly, the processor 1020 may include the packet in the VPN tunnel.

Figure 7:
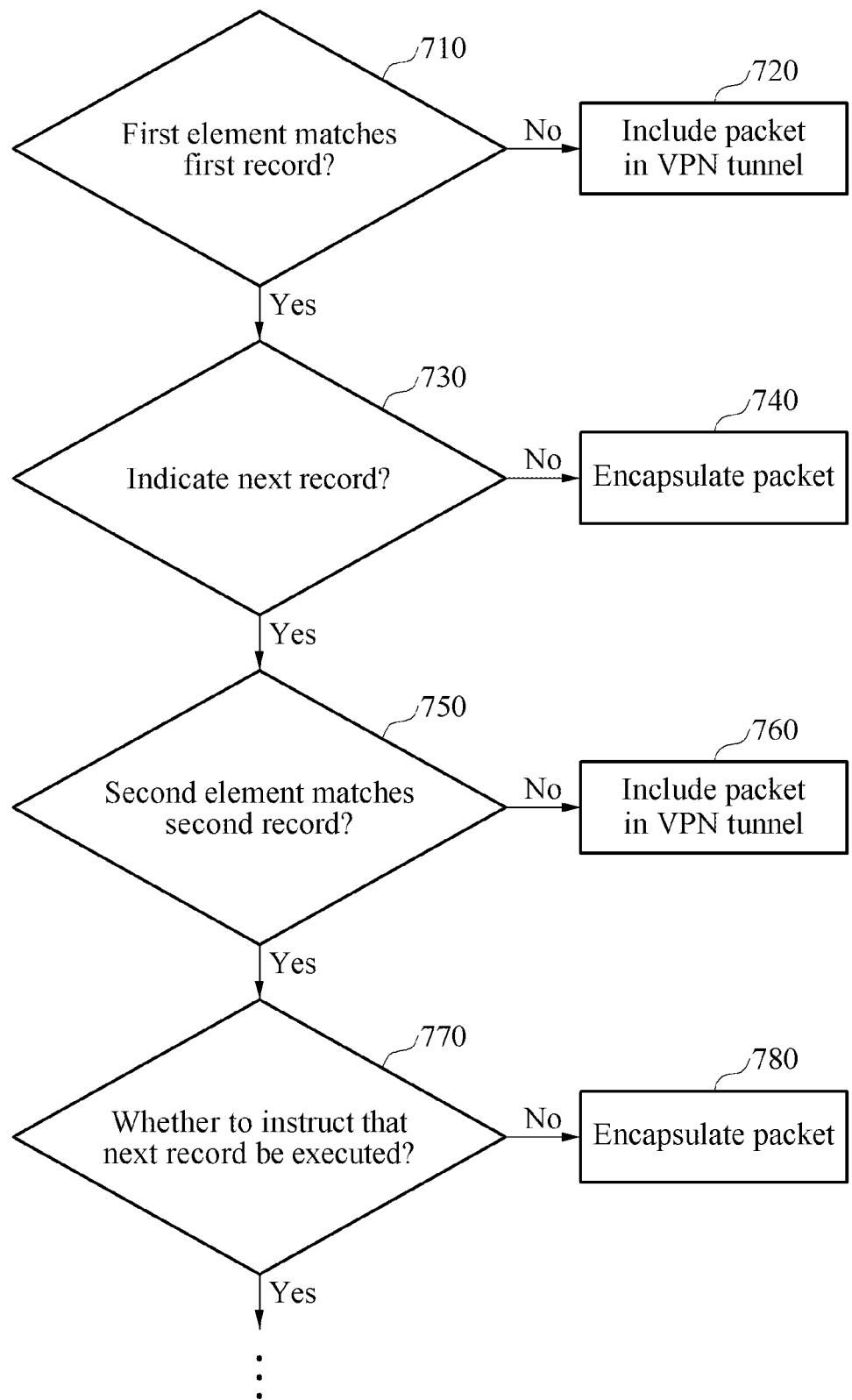
FIG. 7 is a flowchart illustrating a process of determining whether a packet bypasses a VPN tunnel using a plurality of records according to an example embodiment.

FIG. 7 is a flowchart illustrating a process of determining whether a packet bypasses a VPN tunnel using a plurality of records according to an example embodiment.

In FIG. 7, an operation wherein an element matches a record may include instructing that a packet bypass the VPN tunnel or instructing that a next record be executed. The operation wherein the element does not match the record may include including the packet in the VPN tunnel. A case in which an element according to an example embodiment matches a record may include a case in which a condition for performing the operation is satisfied. The case in which the element according to an example embodiment matches the record may include a case in which a protocol information value (e.g., the first value, the second value, . . . ) included in the record is the same as information based on the offset in the element.

According to an example embodiment, the operation wherein the element matches the record may include including the packet in the VPN tunnel or instructing that the next record be executed, and the operation wherein the element does not match the record may include instructing that the packet bypass the VPN tunnel.

The processor 1020 according to an example embodiment may determine whether a first element matches a first record in operation 710. When the first element does not match the first record (NO in operation 710), the processor 1020 may include the packet in the VPN tunnel in operation 720. When the first element matches the first record (YES in operation 710), the processor 1020 may determine whether to indicate a next record in operation 730.

When information 455 related to an operation to be executed when an execution condition is satisfied for the first record according to an example embodiment causes the packet to bypass the VPN tunnel, the processor 1020 may encapsulate the packet in operation 740.

According to an example embodiment, when the information 455 related to the operation to be executed when the execution condition is satisfied for the first record instructs that the next record be executed, the processor 1020 may determine whether to cause the packet to bypass the VPN tunnel, based on the next record.

The processor 1020 according to an example embodiment may determine whether a second element matches a second record in operation 750. When the second element does not match the second record, the processor 1020 may include the packet in the VPN tunnel in operation 760. When the second element matches the second record, the processor 1020 may determine whether to indicate the next record, in operation 770, based on the information 455 related to the operation to be executed when the execution condition is satisfied for the first record.

According to an example embodiment, when the information 455 related to the operation to be executed when the execution condition is satisfied for the first record causes the packet to bypass the VPN tunnel, the processor 1020 may encapsulate the packet in operation 780.

According to an example embodiment, when the information 455 related to the operation to be performed when the execution condition is satisfied for the first record instructs that the next record be executed, the processor 1020 may determine whether to cause the packet to bypass the VPN tunnel based on the next record.

The processor 1020 according to an example embodiment may repeat a process of analyzing the element based on a plurality of records included in the security rule to determine whether the packet bypasses the VPN tunnel.

Figure 8:
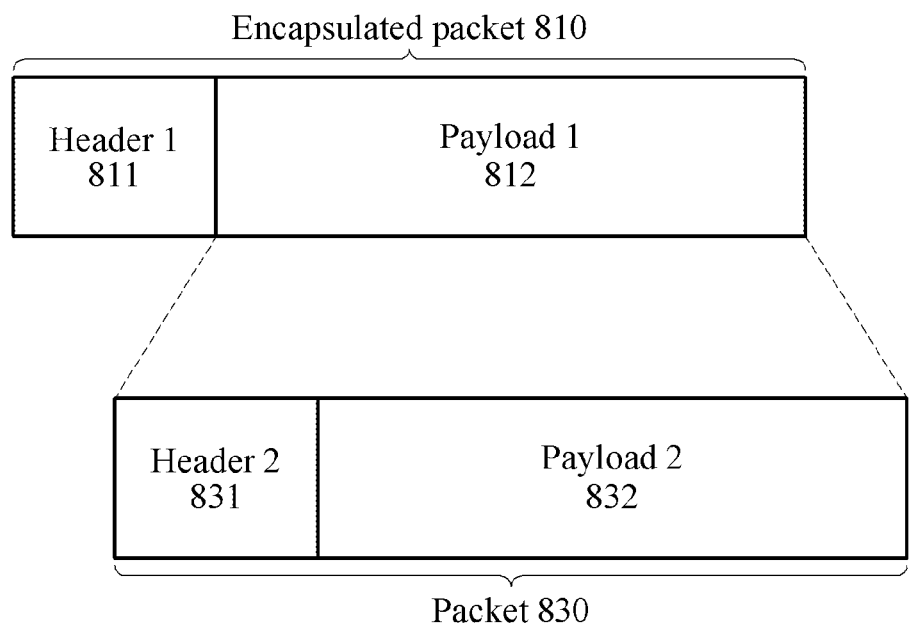
FIG. 8 is a diagram illustrating a process of encapsulating a packet according to an example embodiment.

FIG. 8 is a diagram illustrating a process of encapsulating a packet according to an example embodiment.

FIG. 8 illustrates an encapsulated packet 810, a header (header 1) 811, a payload (payload 1) 812, a packet 830, a header (header 2) 831, and a payload (payload 2) 832.

Encapsulating according to an example embodiment may include adding a header to data received from another communication layer (e.g., data received from a higher layer) and setting the received data as a payload. The encapsulating according to an example embodiment may include hiding received information from a higher layer.

The packet 830 according to an example embodiment may include a packet (bypassing the VPN tunnel) not included in the VPN tunnel. The packet 830 according to an example embodiment may include the header 831 and the payload 832. The packet 830 shown in FIG. 8 is only an example and the scope is not limited thereto.

The encapsulating according to an example embodiment may include adding an element including an address of the packet forwarding server 260 to a packet. For example, an element including the address of the packet forwarding server 260 may correspond to the header 811 illustrated in FIG. 8. The processor 1020 according to an example embodiment may perform the encapsulating by generating the encapsulated packet 810 with the header 811 including the address of the packet forwarding server 260 as a header and the packet 830 as a payload.

The processor 1020 according to an example embodiment may set the address of the packet forwarding server 260 as a destination address in the header 811. Such a process may allow the processor 1020 to transmit the encapsulated packet 810 to the packet forwarding server 260. The destination address according to an example embodiment may include an IP address of a destination of the packet.

Figure 9:
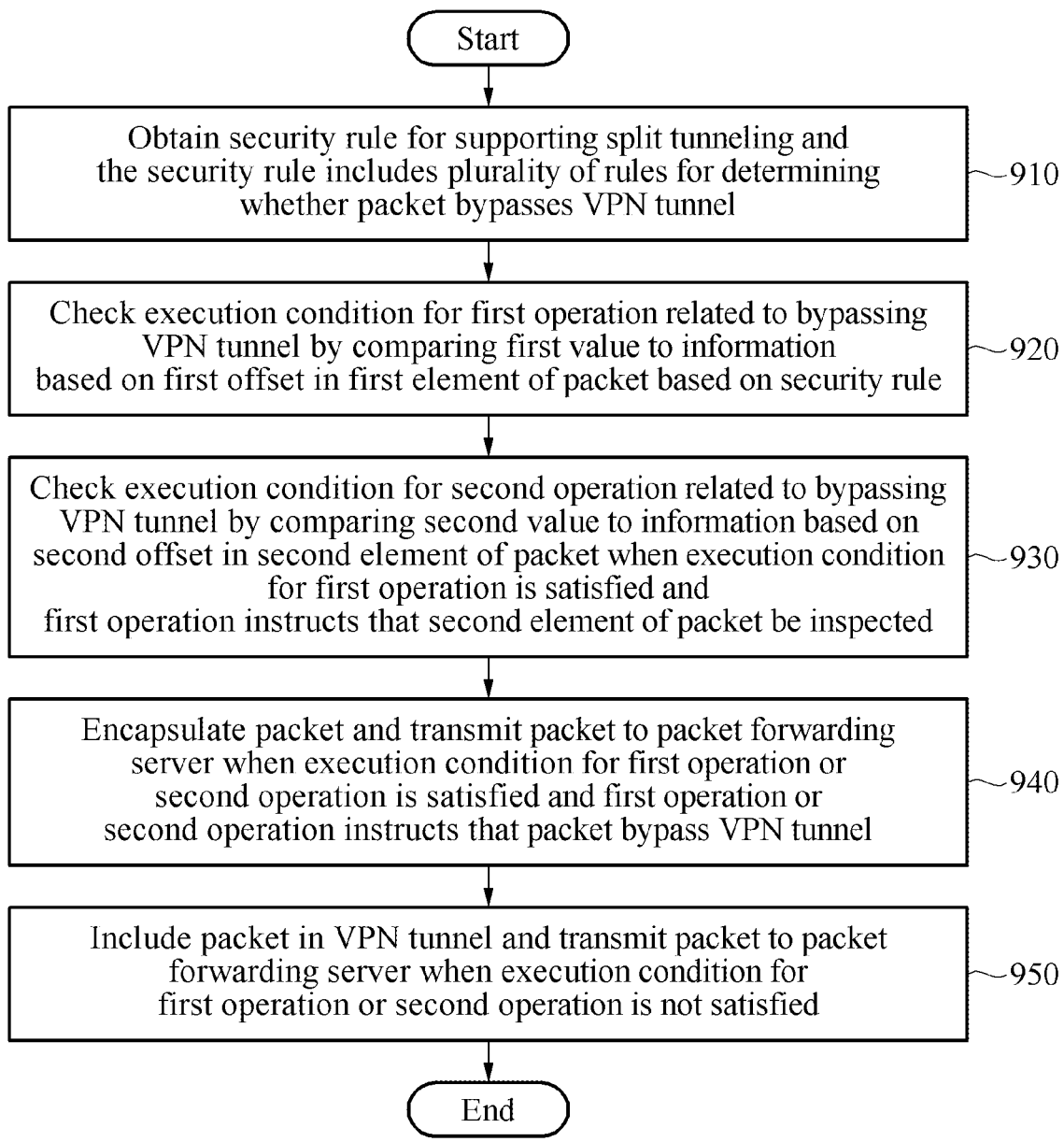
FIG. 9 is a flowchart illustrating a method of operating an electronic device.

FIG. 9 is a flowchart illustrating a method 900 of split tunneling according to an example embodiment.

An electronic device 1001 (e.g., the processor 1020 of FIG. 10) according to an example embodiment may include a security rule for supporting split tunneling and the security rule may include a plurality of rules for determining whether a packet bypasses a VPN tunnel in operation 910.

The electronic device 1001 according to an example embodiment may compare a first value to information based on a first offset in a first element of the packet based on the security rule so that the electronic device 1001 may check a condition for executing a first operation related to the packet bypassing the VPN tunnel in operation 920.

When the condition for executing the first operation is satisfied and the first operation instructs that a second element of the packet be inspected, the electronic device 1001 according to an example embodiment may compare a second value to information based on a second offset in a second element based on the second record so that the electronic device 1001 may check a condition for executing a second operation related to the packet bypassing the VPN tunnel in operation 930.

When the condition for performing the first operation or the second operation is satisfied and the first operation or the second operation instructs that the packet bypass the VPN tunnel, the electronic device 1001 according to an example embodiment may encapsulate the packet while not including the packet in the VPN tunnel and then transmit the encapsulated packet to the packet forwarding server in operation 940.

The security rule according to an example embodiment may include a plurality of records for determining whether the packet bypasses the VPN tunnel.

The electronic device 1001 according to an example embodiment may check a condition for executing a first operation related to bypassing the VPN tunnel by comparing a first value to information based on a first offset in a first element of the packet, based on a first record comprised in the security rule, check a condition for executing a second operation related to bypassing the VPN tunnel by comparing a second value to information based on a second offset in a second element of the packet, based on a second record when the condition for executing the first operation is satisfied, and the first operation in the first record instructs that the second record included in the security rule be executed, encapsulate the packet while not including the packet in the VPN tunnel and transmit the encapsulated packet to the packet forwarding server when the condition for executing the first operation or the condition for executing the second operation is satisfied and the first operation or the second operation in the first record or the second record instructs that the packet bypass the VPN tunnel.

When the condition for performing the first operation or the second operation is not satisfied, the electronic device 1001 according to an example embodiment may include the packet in the VPN tunnel and then transmit the packet to the packet forwarding server in operation 950.

When the condition for performing the first operation or the second operation is satisfied and the first operation or the second operation in the first record or the second record instructs that the packet be included in the VPN tunnel, the electronic device 1001 according to an example embodiment may include the packet in the VPN tunnel and transmit the packet to the packet forwarding server.

The packet according to an example embodiment may be transmitted to at least one of a target server or a gateway based on whether the packet bypasses the VPN tunnel.

The packet transmitted to at least one of the target server and the gateway according to an example embodiment may include a packet of which a source address is changed to an address of the packet forwarding server.

The electronic device 1001 according to an example embodiment may send the packet forwarding server a request for a VPN connection to establish the VPN connection.

The security rule according to an example embodiment may include a rule for determining whether the packet is included in a VPN tunnel or bypasses the VPN tunnel based on protocol information included in the packet.

Protocol information according to an example embodiment may include at least one of protocol identification information, a port number, a header type, and protocol version information.

When the second operation instructs that a third record included in the security rule be executed, the electronic device 1001 according to an example embodiment checks an execution condition for a third operation related to bypassing the VPN tunnel by comparing a third value to information based on a third offset in a third element of the packet based on the third record. "Based on" as used herein covers based at least on.

The electronic device 1001 according to an example embodiment may include the packet in the VPN tunnel and transmit the packet to the packet forwarding server when the condition for executing the first operation, the condition for executing the second operation, or the condition for executing the third operation is satisfied and the first operation, the second operation or the third operation instructs that the packet be included in the VPN tunnel.

In the electronic device 1001 according to an example embodiment may encapsulate the packet while not including the packet in the VPN tunnel and transmit the encapsulated packet to the packet forwarding server when the condition for executing the first operation, the condition for executing the second operation, or the condition for executing the third operation is satisfied and the first operation, the second operation or the third operation in the first record, the second record, or the third record instructs that the packet bypass the VPN tunnel.

Encapsulating of the packet according to an example embodiment may add an element comprising an address of the packet forwarding server to the packet.

The electronic device 1001 according to an example embodiment may set the address of the packet forwarding server in an element as a destination address.

The electronic device 1001 according to an example embodiment may receive an updated security rule from a server and update the security rule.

Each embodiment herein may be used in combination with any other embodiment(s) described herein.

FIG. 10 is a block diagram illustrating an electronic device in a network environment according to various example embodiments.

FIG. 10 is a block diagram illustrating an electronic device 1001 in a network environment 1000 according to various example embodiments. Referring to FIG. 10, the electronic device 1001 in the network environment 1000 may communicate with an electronic device 1002 via a first network 1098 (e.g., a short-range wireless communication network), or communicate with at least one of an electronic device 1004 or a server 1008 via a second network 1099 (e.g., a long-range wireless communication network). According to an example embodiment, the electronic device 1001 may communicate with the electronic device 1004 via the server 1008. According to an example embodiment, the electronic device 1001 may include a processor 1020, a memory 1030, an input module 1050, a sound output module 1055, a display module 1060, an audio module 1070, and a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some example embodiments, at least one (e.g., the connecting terminal 1078) of the above components may be omitted from the electronic device 1001, or one or more other components may be added in the electronic device 1001. In some example embodiments, some (e.g., the sensor module 1076, the camera module 1080, or the antenna module 1097) of the components may be integrated as a single component (e.g., the display module 1060, including a display).

The processor 1020 may execute, for example, software (e.g., a program 1040) to control at least one other component (e.g., a hardware or software component) of the electronic device 1001 connected, directly or indirectly, to the processor 1020, and may perform various data processing or computation. According to an example embodiment, as at least a part of data processing or computation, the processor 1020 may store a command or data received from another component (e.g., the sensor module 1076 comprising at least one sensor, or the communication module 1090 comprising communication circuitry) in a volatile memory 1032, process the command or the data stored in the volatile memory 1032, and store resulting data in a non-volatile memory 1034, which may include internal memory 1036 and/or external memory 1038. According to an example embodiment, the processor 1020 may include a main processor 1021 (e.g., a central processing unit (CPU) or an application processor) or an auxiliary processor 1023 (e.g., a graphics processing unit (GPU), a neural processing unit (NPU), an image signal processor (ISP), a sensor hub processor, or a communication processor (CP)) that is operable independently of, or in conjunction with the main processor 1021. For example, when the electronic device 1001 includes the main processor 1021 and the auxiliary processor 1023, the auxiliary processor 1023 may be adapted to consume less power than the main processor 1021 or to be specific to a specified function. The auxiliary processor 1023 may be implemented separately from the main processor 1021 or as a part of the main processor 1021. Each "processor" herein, and each server herein, comprises processing circuitry.

The auxiliary processor 1023 may control at least some of functions or states related to at least one (e.g., the display module 1060, the sensor module 1076, or the communication module 1090) of the components of the electronic device 1001, instead of the main processor 1021 while the main processor 1021 is in an inactive (e.g., sleep) state or along with the main processor 1021 while the main processor 1021 is an active state (e.g., executing an application). According to an example embodiment, the auxiliary processor 1023 (e.g., an ISP or a CP) may be implemented as a portion of another component (e.g., the camera module 1080 or the communication module 1090) that is functionally related to the auxiliary processor 1023. According to an example embodiment, the auxiliary processor 1023 (e.g., an NPU) may include a hardware structure specified for artificial intelligence model processing. An artificial intelligence model may be generated by machine learning. Such learning may be performed by, for example, the electronic device 1001 in which artificial intelligence is performed, or may be performed via a separate server (e.g., the server 1008). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored as software in the memory 1030, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output a sound signal to the outside of the electronic device 1001. The sound output module 1055 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 1060 may visually provide information to the outside (e.g., a user) of the electronic device 1001 (e.g., a user). The display module 1060 may include, for example, a control circuit for controlling a display, a hologram device, or a projector and control circuitry to control a corresponding one of the display, the hologram device, and the projector. According to an example embodiment, the display module 1060 may include a touch sensor adapted to sense a touch, or a pressure sensor adapted to measure an intensity of a force incurred by the touch.

The audio module 1070 may convert a sound into an electric signal or vice versa. According to an example embodiment, the audio module 1070 may obtain the sound via the input module 1050 or output the sound via the sound output module 1055 or an external electronic device (e.g., the electronic device 1002 such as a speaker or a headphone) directly or wirelessly connected to the electronic device 1001.

The sensor module 1076, comprising at least one sensor, may detect an operational state (e.g., power or temperature) of the electronic device 1001 or an environmental state (e.g., a state of a user) external to the electronic device 1001, and generate an electric signal or data value corresponding to the detected state. According to an example embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., by wire) or wirelessly. According to an example embodiment, the interface 1077 may include, for example, a high-definition multimedia interface (HDMI), a universal serial bus (USB) interface, a secure digital (SD) card interface, or an audio interface.

The connecting terminal 1078 may include a connector via which the electronic device 1001 may be physically connected, directly or indirectly, to an external electronic device (e.g., the electronic device 1002). According to an example embodiment, the connecting terminal 1078 may include, for example, an HDMI connector, a USB connector, an SD card connector, or an audio connector (e.g., a headphone connector).

The haptic module 1079 may convert an electric signal into a mechanical stimulus (e.g., a vibration or a movement) or an electrical stimulus which may be recognized by a user via his or her tactile sensation or kinesthetic sensation. According to an example embodiment, the haptic module 1079 may include, for example, a motor, a piezoelectric element, or an electric stimulator.

The camera module 1080, comprising a camera, may capture still images and moving images. According to an example embodiment, the camera module 1080 may include one or more lenses, image sensors, image signal processors, or flashes.

The power management module 1088 may manage power supplied to the electronic device 1001. According to an example embodiment, the power management module 1088 may be implemented as, for example, at least a part of a power management integrated circuit (PMIC).

The battery 1089 may supply power to at least one component of the electronic device 1001. According to an example embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090, comprising communication circuitry, may include one or more communication processors that are operable independently of the processor 1020 (e.g., an application processor) and that support a direct (e.g., wired) communication or a wireless communication. According to an example embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module, or a power line communication (PLC) module). A corresponding one of these communication modules may communicate with the external electronic device 1004 via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the SIM 1096.

The wireless communication module 1092 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., a mmWave band) to achieve, e.g., a high data transmission rate. The wireless communication module 1092 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 1092 may support various requirements specified in the electronic device 1001, an external electronic device (e.g., the electronic device 1004), or a network system (e.g., the second network 1099). According to an example embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an example embodiment, the antenna module 1097 may include an antenna including a radiating element including a conductive material or a conductive pattern formed in or on a substrate (e.g., a printed circuit board (PCB)). According to an example embodiment, the antenna module 1097 may include a plurality of antennas (e.g., array antennas). In such a case, at least one antenna appropriate for a communication scheme used in a communication network, such as the first network 1098 or the second network 1099, may be selected by, for example, the communication module 1090 from the plurality of antennas. The signal or the power may be transmitted or received between the communication module 1090 and the external electronic device via the at least one selected antenna. According to an example embodiment, another component (e.g., a radio frequency integrated circuit (RFIC)) other than the radiating element may be additionally formed as a part of the antenna module 1097.

According to various example embodiments, the antenna module 1097 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 1001 and the external electronic device 1004 via the server 1008 coupled, directly or indirectly, with the second network 1099. Each of the external electronic devices 1002 and 1004 may be a device of the same type as or a different type from the electronic device 1001. According to an example embodiment, all or some of operations to be executed by the electronic device 1001 may be executed at one or more of the external electronic devices 1002 and 1004, and the server 1008. For example, if the electronic device 1001 needs to perform a function or a service automatically, or in response to a request from a user or another device, the electronic device 1001, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In an example embodiment, the external electronic device 1004 may include an Internet-of-things (IoT) device. The server 1008 may be an intelligent server using machine learning and/or a neural network. According to an example embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   at least one processor comprising processing circuitry; and
   a memory configured to store instructions executable by the at least one processor,
   wherein the at least one processor is individually and/or collectively configured to:
   obtain a security rule for supporting split tunneling, wherein the security rule comprises a plurality of rules for determining whether a packet bypasses a virtual private network (VPN) tunnel;
   check a condition for executing a first operation related to bypassing the VPN tunnel at least by comparing a first value to information based on a first offset in a first element of the packet, based on the security rule;
   check a condition for executing a second operation related to bypassing the VPN tunnel at least by comparing a second value to information based on a second offset in a second element of the packet when the condition for executing the first operation is satisfied and the first operation instructs that the second element of the packet be inspected;

encapsulate the packet while not including the packet in the VPN tunnel and control to transmit the encapsulated packet to a packet forwarding server when the condition for executing the first operation and/or the condition for executing the second operation is satisfied, and the first operation and/or the second operation instructs that the packet bypass the VPN tunnel;

include the packet in the VPN tunnel and control to transmit the packet to the packet forwarding server when the condition for executing the first operation and/or the condition for executing the second operation is not satisfied; and include the packet in the VPN tunnel and control to transmit the packet to the packet forwarding server when the condition for executing the first operation and/or the condition for executing the second operation is satisfied, and the first operation and/or the second operation in a first record and/or a second record instructs that the packet be comprised in the VPN tunnel.

2. The electronic device of claim 1, wherein the security rule comprises a plurality of records for determining whether to bypass the VPN tunnel.

3. The electronic device of claim 2, wherein the processor is configured to: check the condition for executing the first operation related to bypassing the VPN tunnel at least by comparing the first value to the information based on the first offset in the first element of the packet, based on a first record comprised in the security rule; check the condition for executing the second operation related to bypassing the VPN tunnel at least by comparing the second value to the information based on the second offset in the second element of the packet, based on a second record when the condition for executing the first operation is satisfied, and the first operation in the first record instructs that the second record comprised in the security rule be executed; and encapsulate the packet while not including the packet in the VPN tunnel and control to transmit the encapsulated packet to the packet forwarding server when the condition for executing the first operation and/or the condition for executing the second operation is satisfied, and the first operation and/or the second operation in the first record and/or the second record instructs that the packet bypass the VPN tunnel.

4. The electronic device of claim 1, wherein the processor is configured so that the packet is to be transmitted to at least one of a target server or a gateway, based on whether the packet bypasses the VPN tunnel.

5. The electronic device of claim 4, wherein the packet to be transmitted to the at least one of the target server or the gateway comprises a packet of which a source address is changed to an address of the packet forwarding server.

6. The electronic device of claim 1, wherein the processor is configured to establish a VPN connection at least by sending a request for the VPN connection to the packet forwarding server.

7. The electronic device of claim 1, wherein the security rule comprises a rule for determining whether the packet is included in the VPN tunnel or bypasses the VPN tunnel based on protocol information comprised in the packet.

8. The electronic device of claim 7, wherein the protocol information comprises at least one of: protocol identification information, a port number, a header type, and protocol version information.

9. The electronic device of claim 1, wherein the processor is configured to check a condition for executing a third operation related to bypassing the VPN tunnel at least by comparing a third value to information based on a third offset in a third element of the packet based on a third record when the second operation instructs that the third record included in the security rule be executed.

10. The electronic device of claim 9, wherein the processor is configured to include the packet in the VPN tunnel and control to transmit the packet to the packet forwarding server when at least one of the condition for executing the first operation, the condition for executing the second operation, and/or the condition for executing the third operation is satisfied, and at least one of the first operation, the second operation and/or the third operation instructs that the packet be included in the VPN tunnel.

11. The electronic device of claim 9, wherein the processor is configured to encapsulate the packet while not including the packet in the VPN tunnel and control to transmit the encapsulated packet to the packet forwarding server when at least one of the condition for executing the first operation, the condition for executing the second operation, and/or the condition for executing the third operation is satisfied, and at least one of the first operation, the second operation and/or the third operation in a first record, a second record, and/or the third record instructs that the packet bypass the VPN tunnel.

12. The electronic device of claim 1, wherein the encapsulating of the packet is to add an element comprising an address of the packet forwarding server to the packet.

13. The electronic device of claim 12, wherein the processor is configured to set the address of the packet forwarding server in the element as a destination address.

14. The electronic device of claim 1, wherein the processor is configured to receive an updated security rule from a server and update the security rule.

15. A split tunneling method, the method comprising:
obtaining a security rule for supporting split tunneling, wherein the security rule comprises a plurality of rules for determining whether a packet bypasses a virtual private network (VPN) tunnel;
checking a condition for executing a first operation related to bypassing the VPN tunnel at least by comparing a first value to information based on a first offset in a first element of the packet, based on the security rule;
checking a condition for performing a second operation related to bypassing the VPN tunnel at least by comparing a second value to information based on a second offset in a second element of the packet when the condition for executing the first operation is satisfied and the first operation instructs that the second element of the packet be inspected;
encapsulating the packet while not including the packet in the VPN tunnel, and transmitting the encapsulated packet to a packet forwarding server, when the condition for executing the first operation and/or the condition for executing the second operation is satisfied, and the first operation and/or the second operation instructs that the packet bypass the VPN tunnel;
including the packet in the VPN tunnel and transmitting the packet to the packet forwarding server when the condition for executing the first operation and/or the condition for executing the second operation is not satisfied; and
including the packet in the VPN tunnel and transmitting the packet to the packet forwarding server when the condition for executing the first operation and/or the condition for executing the second operation is satisfied, and the first operation and/or the second operation in a first record and/or a second record instructs that the packet be comprised in the VPN tunnel.

16. The method of claim 15, wherein the security rule comprises a plurality of records for determining whether to bypass the VPN tunnel.

17. The method of claim 15, further comprising including the packet in the VPN tunnel and transmitting the packet to the packet forwarding server when the condition for executing the first operation and/or the condition for executing second operation is satisfied, and the first operation and/or the second operation in a first record and/or a second record instructs that the packet be included in the VPN tunnel.

18. The method of claim 15, wherein the packet is transmitted to at least one of a target server or a gateway based on whether the packet bypasses the VPN tunnel.

19. The method of claim 18, wherein the packet transmitted to the at least one of the target server or the gateway comprises a packet of which a source address is changed to an address of the packet forwarding server.

20. The method of claim 15, further comprising establishing a VPN connection at least by sending a request for the VPN connection to the packet forwarding server before obtaining the security rule.

21. The method of claim 15, wherein the security rule comprises a rule for determining whether the packet bypasses the VPN tunnel based on protocol information comprised in the packet.

22. The method of claim 21, wherein the protocol information comprises at least one of: protocol identification information, a port number, a header type, and protocol version information.

23. The method of claim 15, further comprising checking a condition for performing a third operation related to bypassing the VPN terminal at least by comparing a third value to information based on a third offset in a third element of the packet, based on a third record, when the second operation instructs that the third record included in the security rule be executed.

24. The method of claim 23, comprising, after the checking of the condition for executing the third operation, including the packet in the VPN tunnel and transmitting the packet to the packet forwarding server when at least one of the condition for executing the first operation, the condition for executing the second operation, or the condition for executing the third operation is satisfied, and when at least one of the first operation, the second operation or the third operation in a first record, a second record, and/or the third record, instructs that the packet be included in the VPN tunnel.

25. The method of claim 23, further comprising, after the checking of the condition for executing the third operation, encapsulating the packet while not including the packet in the VPN tunnel and transmitting the packet to the packet forwarding server when at least one of the condition for executing the first operation, the condition for executing the second operation, or the condition for executing the third operation is satisfied, and at least one of the first operation, the second operation or the third operation in a first record, a second record, and/or the third record instructs that the packet bypass the VPN tunnel.

26. The method of claim 15, wherein the encapsulating of the packet comprises adding an element comprising an address of the packet forwarding server to the packet.

27. The method of claim 15, wherein the encapsulating of the packet and the transmitting of the encapsulated packet to the packet forwarding server comprises encapsulating the packet by changing an address of the packet forwarding server to a destination address.

28. The method of claim 15, wherein the obtaining of the security rule comprises receiving an updated security rule from a server and updating the security rule.

29. A non-transitory computer-readable storage medium storing instructions that, when executed by a processor, cause the processor to perform a method comprising:
obtaining a security rule for supporting split tunneling, wherein the security rule comprises a plurality of rules for determining whether a packet bypasses a virtual private network (VPN) tunnel;
checking a condition for executing a first operation related to bypassing the VPN tunnel at least by comparing a first value to information based on a first offset in a first element of the packet, based on the security rule;
checking a condition for performing a second operation related to bypassing the VPN tunnel at least by comparing a second value to information based on a second offset in a second element of the packet when the condition for executing the first operation is satisfied and the first operation instructs that the second element of the packet be inspected;
encapsulating the packet while not including the packet in the VPN tunnel, and transmitting the encapsulated packet to a packet forwarding server, when the condition for executing the first operation and/or the condition for executing the second operation is satisfied, and the first operation and/or the second operation instructs that the packet bypass the VPN tunnel;
including the packet in the VPN tunnel and transmitting the packet to the packet forwarding server when the condition for executing the first operation and/or the condition for executing the second operation is not satisfied; and
including the packet in the VPN tunnel and transmitting the packet to the packet forwarding server when the condition for executing the first operation and/or the condition for executing the second operation is satisfied, and the first operation and/or the second operation in a first record and/or a second record instructs that the packet be comprised in the VPN tunnel.

* * * * *